US011001256B2

(12) United States Patent
Packer et al.

(10) Patent No.: US 11,001,256 B2
(45) Date of Patent: May 11, 2021

(54) COLLISION PREDICTION AND AVOIDANCE FOR VEHICLES

(71) Applicant: Zoox, Inc., Foster City, CA (US)

(72) Inventors: Jefferson Bradfield Packer, San Francisco, CA (US); Zhenqi Huang, San Carlos, CA (US); William Anthony Silva, San Fransisco, CA (US)

(73) Assignee: Zoox, Inc., Foster, CA (US)

( * ) Notice: Subject to any disclaimer, the term of this patent is extended or adjusted under 35 U.S.C. 154(b) by 252 days.

(21) Appl. No.: 16/136,038

(22) Filed: Sep. 19, 2018

(65) Prior Publication Data

US 2020/0086855 A1 Mar. 19, 2020

(51) Int. Cl.
*B60W 30/09* (2012.01)
*B60W 30/095* (2012.01)
*G05D 1/00* (2006.01)
*G08G 1/16* (2006.01)

(52) U.S. Cl.
CPC ........ *B60W 30/09* (2013.01); *B60W 30/0953* (2013.01); *B60W 30/0956* (2013.01); *G05D 1/0088* (2013.01); *G08G 1/166* (2013.01)

(58) Field of Classification Search
CPC ............. B60W 30/09; B60W 30/0953; B60W 30/0956; B60W 50/0097; B60W 60/00276; B60W 2554/4045; G05D 1/0088; G05D 1/0289; G08G 1/161; G08G 1/166
See application file for complete search history.

(56) References Cited

U.S. PATENT DOCUMENTS

| 7,095,336 B2 * | 8/2006 | Rodgers ................. G08G 1/161 340/435 |
| 9,168,922 B1 * | 10/2015 | Martin .............. B60W 30/0953 |
| 2006/0031015 A1 * | 2/2006 | Paradie ............. G06K 9/00805 701/301 |
| 2009/0143987 A1 * | 6/2009 | Bect ...................... B60W 40/02 701/301 |
| 2010/0305858 A1 * | 12/2010 | Richardson ........ G06K 9/00785 701/301 |

(Continued)

FOREIGN PATENT DOCUMENTS

WO WO2017180364 10/2017

OTHER PUBLICATIONS

The PCT Search Report and Written Opinion dated Dec. 3, 2019 for PCT Application No. PCT/US2019/051761, 14 pages.

*Primary Examiner* — Anshul Sood
(74) *Attorney, Agent, or Firm* — Lee & Hayes, P.C.

(57) ABSTRACT

A vehicle computing system may implement techniques to control a vehicle to avoid collisions between the vehicle and agents (e.g., dynamic objects) in an environment. The techniques may include generating a representation of a path of the vehicle through an environment as a polygon. The vehicle computing system may compare the two-dimensional path with a trajectory of an agent determined using sensor data to determine a collision zone between the vehicle and the agent. The vehicle computing system may determine a risk of collision based on predicted velocities and probable accelerations of the vehicle and the agent approaching and traveling through the collision zone. Based at least in part on the risk of collision, the vehicle computing system may cause the vehicle to perform an action.

20 Claims, 9 Drawing Sheets

(56) References Cited

U.S. PATENT DOCUMENTS

| | | |
|---|---|---|
| 2013/0179047 A1 | 7/2013 | Miller et al. |
| 2015/0294571 A1* | 10/2015 | Shida ............... G08G 1/161 |
| | | 701/409 |
| 2016/0375901 A1* | 12/2016 | Di Cairano ........ G01C 21/3453 |
| | | 701/26 |
| 2017/0372612 A1 | 12/2017 | Bai et al. |
| 2018/0136662 A1 | 5/2018 | Kim |
| 2018/0151077 A1 | 5/2018 | Lee |
| 2018/0345958 A1* | 12/2018 | Lo ..................... G08G 1/166 |
| 2019/0005821 A1* | 1/2019 | Matsunaga ........... B60W 10/18 |
| 2019/0278280 A1* | 9/2019 | Imai .................... B60W 30/09 |

* cited by examiner

COLLISION PREDICTION AND AVOIDANCE FOR VEHICLES

BACKGROUND

Vehicles may be equipped with collision avoidance systems configured to detect and avoid objects in an operating environment. The objects may include mobile objects, such as other vehicles, cyclists, pedestrians, etc. Traditional collision avoidance systems may avoid collisions by simply identifying the presence of surfaces in an environment and adjusting a velocity of a vehicle to avoid collision with a surface. However, these traditional systems may cause the vehicle to yield in situations in which it is unnecessary and unnatural, thereby potentially causing traffic delays.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is an illustration of a time-space overlap in which the collision avoidance system may determine a high risk of collision between the vehicle and the agent based on a position cone associated with an agent overlapping with the autonomous vehicle along the planned path. FIG. 3B is an illustration of a time-space overlap in which the collision avoidance system may determine a low risk of collision between the vehicle and the agent based on a position cone associated with the agent not overlapping with the autonomous vehicle along the planned path.

DETAILED DESCRIPTION

Figure 1:
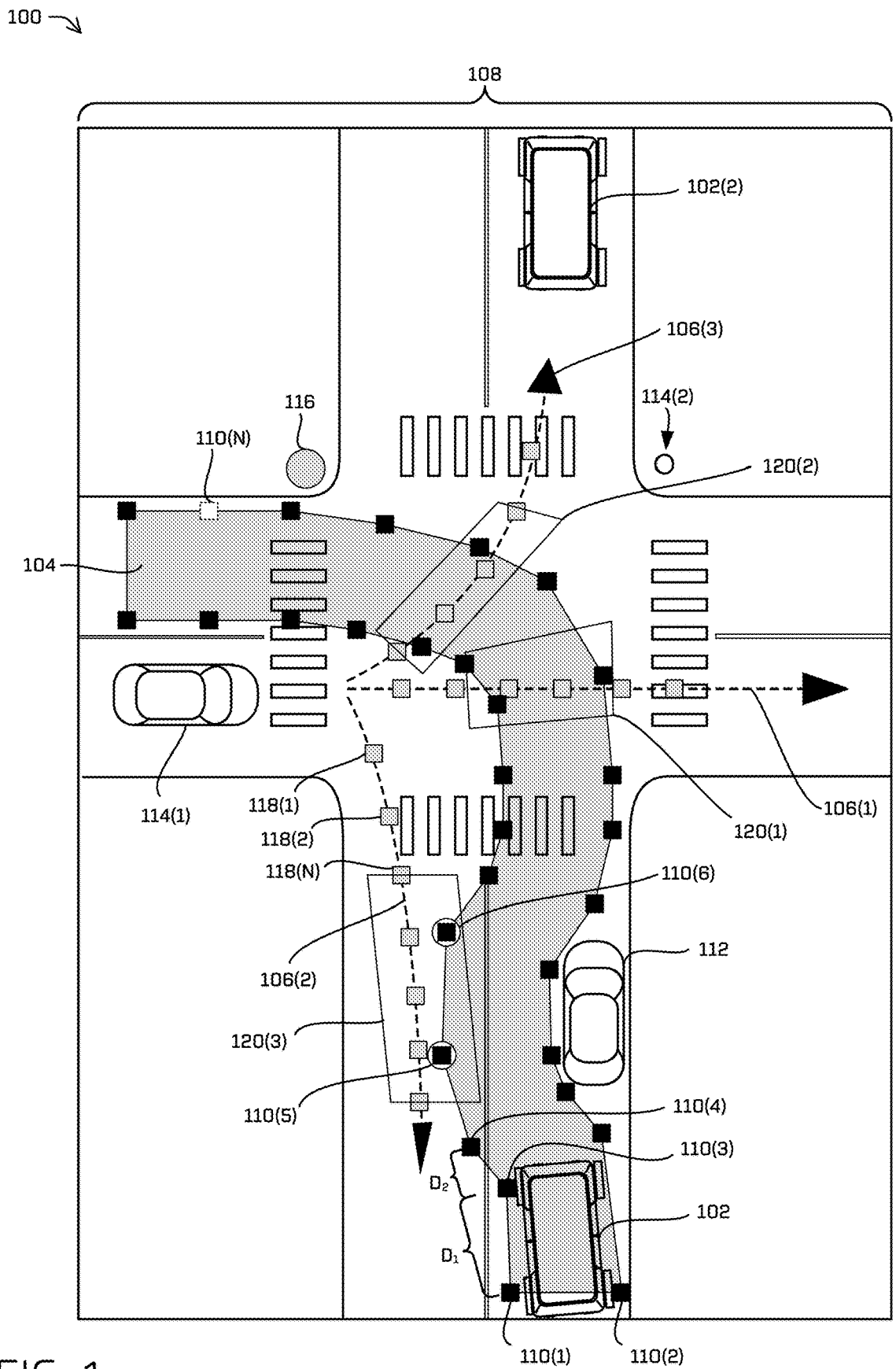
FIG. 1 is an illustration of an autonomous vehicle in an environment, wherein a path polygon of the autonomous vehicle and estimated agent trajectories are overlaid in the illustration representing a two-dimensional map of the environment generated by a collision avoidance system of the autonomous vehicle to determine whether a potential collision zone exists between the autonomous vehicle and an agent, in accordance with embodiments of the disclosure.

This disclosure is directed to techniques for improving collision prediction and avoidance between a vehicle and agents (e.g., dynamic objects) in an environment. The vehicle may include an autonomous or semi-autonomous vehicle. The agents may include other vehicles (e.g., cars, trucks, motorcycles, mopeds, etc.), pedestrians, bicyclists, or the like. A vehicle computing system may be configured to determine possible collision zones between the vehicle and the agents based on probable paths and velocities associated therewith. The vehicle computing system may then be configured to determine an action to perform to avoid a collision in the one or more possible collision zones.

The vehicle computing system may be configured to generate a point path polygon (path polygon) representing a two-dimensional path of the vehicle (e.g., vehicle path) through the environment. The path polygon may include a plurality of point pairs (or simply points) along a planned path of the vehicle. In various examples, the points may include a representation of a left and a right side of the vehicle. For example, the left point may represent a left most extent of the vehicle (e.g., a position of an outer edge of a fender on a left side of the vehicle), and the right point may represent a right most extent of the vehicle (e.g., a position of an outer edge of a fender on a right side of the vehicle). In some examples, the left point and/or the right point of a point pair may include a buffer on a respective side of the vehicle. As an illustrative example, the left point may represent a position of an outer edge of a left bumper plus three inches, and the right point may represent a position of an outer edge of a right bumper plus three inches. The points and/or point pairs of the path polygon may represent points on or proximate to the front of the vehicle, the back of the vehicle, or in between the front and back of the vehicle, though any relative position along the vehicle is contemplated.

In various examples, a buffer associated with the left point and/or the right point of a point pair may be determined based on the planned path of the vehicle. In such examples, the buffer associated with a left point and/or a right point may be adjusted based on a planned maneuver of the vehicle, such as, for example, a turn. For example, for a vehicle turning left, a left point may represent a position of an outer edge of the left tire at maximum deflection plus a buffer (e.g., 3 inches, 6 inches, 12 inches, 3 feet, etc.), and/or a right point may represent a position of an outer edge of the right tire at maximum deflection plus a buffer (e.g., 3 inches, 6 inches, 12 inches, 3 feet, etc.). The buffers on the left and right side may be the same or different. In some examples, such buffers may be dependent on a location of the vehicle (e.g., smaller buffers in highways where no pedestrians are expected, higher buffers in narrow, pedestrian crowded areas, or the like).

In some examples, the vehicle computing system may be configured to apply compression techniques to the path polygon, to reduce a total number of points associated therewith, thereby increasing computation speeds. In such examples, the vehicle computing system may determine that removing a point from the path polygon would result in a change to the area associated with the path polygon. If the change to the area is within a threshold change, the vehicle computing system may remove the point without a significant reduction in accuracy. The threshold change to the area may be based on a percentage of the area affected or a total amount of the area affected. For example, if the change to the area after removal of a point is within 1% of the original area, the vehicle computing system may remove the point. For another example, if the change to the area is less than 2.5 meters$^2$, the vehicle computing system may remove the point. As a non-limiting example, removing a point along the edge of a substantially rectangular polygon would not change the total area. Such a point may be eliminated from consideration. On the other hand, removing a point along an arc with a small radius of curvature may substantially change the polygon area. Such a point would be retained.

The vehicle computing system may be configured to identify agents in the environment. In some examples, the agents may be identified based on sensor data from sensors (e.g., cameras, motion detectors, light detection and ranging (LIDAR), radio detection and ranging (RADAR), etc.) of the vehicle. In some examples, the agents may be identified based on sensor data received from remote sensors, such as, for example, sensors associated with another vehicle or sensors mounted in an environment that are configured to share data with a plurality of vehicles.

The vehicle computing system may determine one or more trajectories of the agent (e.g., positions, velocities, accelerations, etc. of the agent as it moves through an environment) based on the sensor data. The one or more trajectories of the agent may represent possible paths that a center of the agent may travel through the environment. The center of the agent may include an estimated center of mass, an estimated volumetric center point of the agent, or the like. Based on the path polygon of the vehicle and the one or more trajectories, the vehicle computing system may determine whether a potential collision zone exists between the vehicle and the agent. In various examples, the collision zone may include an area in which the path polygon and a trajectory of the one or more trajectories of the agent intersect.

In some examples, the vehicle computing system may determine that an agent trajectory (e.g., represented as the center of the agent) comes within a threshold distance of the path polygon. In such examples, the vehicle computing system may expand the width of the agent trajectory to determine whether a collision zone exists (e.g., whether the vehicle and the agent may collide). In various examples, the vehicle computing system may expand the width of the agent trajectory based on a known width of the agent, such as, for example, as determined by sensor data. In some examples, the vehicle computing system may expand the width of the agent trajectory based on a pre-defined width for the identified agent. For example, the vehicle computing system may identify the agent as a pedestrian. The vehicle computing system may include a pre-defined width for pedestrians of four feet (e.g., a two-foot radius around the pedestrian). For another example, the vehicle computing system may identify the agent as a motorcycle. The vehicle computing system may include a pre-defined width for motorcycles as three feet on either side of a center of the motorcycle (six feet total).

Based on a determination that a collision zone exists between the path polygon and an agent trajectory, the vehicle computing system may apply a time-space overlap to the collision zone to determine whether a collision may occur in the collision zone and/or a likelihood that a collision may occur in the collision zone. The time-space overlap may include planned speeds associated with the vehicle and probable (e.g., predicted) speeds associated with the agent, which may include associated uncertainties. In some examples, the time-space overlap may be represented as a position cone of probable speeds at which the agent may travel through the environment into and through the collision zone. The probable speeds associated with the agent may represent a current speed of the agent (e.g., determined based on sensor data, a speed limit associated with the region, etc.), and probable changes to the current speed. The probable changes to the speed may be based on traffic laws, rules of the road, local driving etiquette, traffic patterns, semantic classification of the agent, predicted interactions of agents in the environment, or the like. The probable speeds may include aggressive driving behaviors and conservative driving behaviors. An aggressive driving profile (e.g., aggressive driving behaviors) is associated with higher maximum speeds, higher maximum accelerations, and/or shorter reaction times than a conservative driving profile (e.g., conservative driving behaviors), while a conservative driving profile may be associated with lower minimum speeds, lower minimum accelerations, and longer reaction times than an aggressive driving profile. In at least one example, an entry point of an agent into a collision zone may be based on an aggressive speed estimate and an exit point of the agent out of the collision zone may be based on a conservative speed estimate. In such an example, the agent's time spent in the collision zone is maximized as a worst-case scenario. Any other combination of conservative and aggressive behaviors of the agent is also contemplated.

In some examples, the time-space overlap may include one or more probability density functions (PDFs) associated with probable positions of the agent based on time. In such examples, the PDF may represent aggressive and conservative motion as well as uncertainties based on accelerations and/or decelerations of the agent, such as those based on traffic laws, rules of the road, local driving etiquette, traffic patterns, semantic classification of the agent, or the like. In various examples, the PDFs may be represented as one or more curves (e.g., Gaussian distributions) overlaid on the collision zone based on timing. Integrations of multiple PDFs (e.g., that of the agent(s) and/or the vehicle) within the area of the collision zone (e.g. integrating the PDFs only in the regions which overlap with the collision zone) may yield a probability. Such probabilities may, in turn, be used to inform planning and decision making. In various examples, the vehicle computing device may determine whether a collision may occur based on the time-space overlap. In some examples, the vehicle computing device may determine that, based on a position cone associated with the agent, the vehicle and the agent may collide in the collision zone, or otherwise have a higher probability that a collision zone is likely. For example, the computing device may determine an entry time associated with an entry point of the agent into the collision zone based on an aggressive speed estimate and an exit time associated with an exit point of the agent out of the collision zone based on a conservative speed estimate. The vehicle computing device may compare the entry time and the exit times of the agent to entry and exit times associated with the vehicle. If the entry and exit times associated with the agent and the vehicle overlap, the vehicle computing device may determine that the agent and the vehicle may collide in the collision zone.

In various examples, the vehicle computing device may determine that, based on one or more probability density functions associated with positions of the agent over time, a probability that the vehicle and the agent may collide in the collision zone. In such examples, the vehicle computing device may plot the PDF(s) with respect to the collision zone to determine if at least part of the PDF(s) intersect with the collision zone. The vehicle computing device may determine an area under the intersecting PDF(s) with respect to the collision zone. If the area under the intersecting PDF(s) exceeds a threshold amount, the vehicle computing device may determine that the vehicle and the agent may collide in the collision zone. In at least other examples, the vehicle may react as a function of the integrated area. As a non-limiting example, the higher the probability, the greater the deceleration applied by the vehicle.

Based on a determination that the vehicle and the agent may collide in the collision zone, or a probability associated therewith, the vehicle computing device may determine an action to perform. The actions may include yielding to the agent (e.g., slowing down or stopping), and/or changing a planned path associated with the vehicle (e.g., lane change right, lane change left, change planned path of vehicle within lane, drive on shoulder, etc.). In some examples, determining the action may include determining a safe stop position for the vehicle. In such examples, the safe stop position may include a position in which little or no risk or probability of collision may exist. In various examples, the vehicle computing device may determine that changing the lane associated with the vehicle path may result in a reduced yield time. In such examples, the vehicle computing device may determine a second collision zone and perform a second time-space overlap to determine an amount, if any, to yield to the agent based on the path change.

The techniques discussed herein may improve a functioning of a vehicle computing device in a number of ways. As mentioned above, the vehicle computing device processes agent trajectory data based on a center of an agent. In some examples, the vehicle computing device may determine whether a collision risk exists based on whether the agent trajectory comes within a threshold distance of the path polygon. If the agent trajectory is within the threshold distance of the path polygon, the vehicle computing device may perform additional calculations to determine whether the collision risk exits. However, if the agent trajectory is not within the threshold distance, the vehicle computing device may avoid performing the additional calculations, thereby increasing the computing power available for other computations and improving the functioning of the computing device. Additionally, or in the alternative, the vehicle computing device may apply compression techniques to the path polygon of the vehicle. The compression techniques may reduce a number of points in the path polygon, thereby reducing a number of calculations that need to be computed to determine whether a collision risk exists. These and other improvements to the functioning of the computer are discussed herein and may, in some instances, be achieved using the techniques described herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an autonomous (or semi-autonomous) vehicle 102 in an environment 100, wherein a point path polygon 104 (path polygon 104) of the autonomous vehicle 102 and estimated agent trajectories 106 are overlaid in the illustration representing a two-dimensional map 108 of the environment 100 generated by an improved collision avoidance system of the autonomous vehicle 102 (vehicle 102). A vehicle computing device may perform the improved collision avoidance system of the vehicle 102. While described as a separate system, in some examples, the collision avoidance techniques described herein may be implemented by other vehicle systems, components, and/or computing devices. For example, and as will be described in further detail with regard to FIG. 5, the collision avoidance techniques described herein may be implemented at least partially by or in associated with a planning component 524.

In various examples, the vehicle computing device may generate the path polygon 104 of the vehicle 102. The path polygon 104 may be defined by a plurality of points 110 and may represent a two-dimensional representation of a planned path of the vehicle 102 through the environment 100. In various examples, the path polygon 104 may be represented as pairs of points 110, though any number of individual points are contemplated. In some examples, the path polygon 104 may comprise a region formed by connecting individual points of the pairs of points 110 to define a perimeter of the path polygon 104. The pairs of points 110 may represent a left boundary and a right boundary of the vehicle 102. In some examples, the left and right boundaries of the vehicle may represent a minimum distance, such as, for example, a width of the vehicle 102. For example, the left and right boundaries may represent a left and right outermost edge of the vehicle, respectively. In some examples, the left and right boundaries (e.g., minimum distance) may additionally include a buffer outside the outermost edge of the vehicle. For example, a left point 110(1) of a point pair may represent a left outermost boundary of the vehicle 102 plus 3 inches, 6 inches, 8 inches, or the like, and a right point 110(2) of the point pair may represent a right outermost boundary of the vehicle 102 plus 3 inches, 6 inches, 8 inches, or the like. The example buffer distances in this example are for illustrative purposes only and may include any distance less than or greater than the distances listed. The buffer on the left side and the right side may be the same or different. A length of the polygon may be associated with a time horizon. For example, trajectories may be calculated in accordance with a receding horizon technique. Lengths of associated polygons may be associated with such a receding horizon.

In various examples, a position of the left and right points 110 of a point pair may be individually adjusted based on a maneuver of the vehicle 102, such as, for example a turn. In such examples, a left point, such as left point 110(1) or right point, such as right point 110(2) of the point pair may be adjusted outward a distance (e.g., 3 inches, 5 inches, 8 inches, etc.) based on the maneuver. In various examples, the left or the right points 110 may be adjusted outward the distance based on a radius of curvature associated with a turn. For example, in a 45-degree right turn, a right point 110 of the point pair may be adjusted outward a distance to account for an additional space the vehicle 102 may occupy as the vehicle 102 travels through the turn.

In various examples, the pairs of points 110 may be represented on the map 108 at consistent intervals with respect to time (e.g., 0.2 second intervals, 0.5 second intervals, etc.). In some examples, the pairs of points 110 may be represented on the map 108 at varying intervals. In various examples, the pairs of points 110 may be represented at equal distances in length (e.g., length along the path) from one another. In such examples, each left/right point 110 of a point pair may be at a pre-defined distance (e.g., 1 meter, 3 feet, 18 inches, etc.) from the next left/right point 110 of the point pair. In some examples, the pairs of points 110 may be represented at different distances in length from one another. In various examples, the distances may be determined based on a maneuver of the vehicle 102, a speed of the vehicle 102, a density of traffic in the environment 100, and/or other factors impacting the vehicle 102. For example, and as illustrated in FIG. 1, a first left point 110(1) and a second left point 110(3) of the path polygon 104 may be a distance $D_1$ from one another while the vehicle 102 continues straight along a path. At the second left point 110(3), the vehicle 102 begins a slight left turn to avoid a parked vehicle 112. Based at least in part on the slight left turn, a distance $D_2$ between the second left point 110(3) and a third left point 110(4) may be less than the distance $D_1$. For another example, the vehicle 102 may slow approaching the parked vehicle 112. In such an example, the distance $D_2$ may be less than the distance $D_1$ based in part on the reduced speed of the vehicle 102.

In various examples, the vehicle computing system may be configured to perform compression techniques on the path polygon 104. In such examples, the vehicle computing system may be configured to improve the speed and function of the vehicle computing system itself and the collision avoidance system by removing points 110 from calculations. In some examples, the vehicle computing system may determine that removing a point 110, such as 110(N), may have no effect or a negligible effect on an area associated with the path polygon 104. The area of the path polygon 104 may be a two-dimensional area (e.g., meters$^2$, feet$^2$, inches$^2$, etc.) of the planned (e.g., intended) path of the vehicle 102 through the environment. In some examples, the vehicle computing system may determine that removing the point 110(N) may modify the area less than a threshold amount. The threshold amount may be a percentage of the total area (e.g., 3%, 5%, 10%, etc.) and/or it may be a pre-defined amount of area (e.g., 2.5 meters$^2$, 2 feet$^2$, 6 inches$^2$ etc.). As illustrated in FIG. 1, the vehicle computing system may determine that removing the point 110(N) would have little or no effect on the area of the path polygon 104. Thus, the vehicle computing device may remove the point 110(N) from calculations, thereby reducing the complexity of the calculations and improving the functioning of the vehicle computing device.

In some examples, the vehicle computing system may determine whether a point 110 in the path polygon 104 is proximate to (e.g., within 50 feet, 15 meters, 25 meters, etc.) a collision risk zone prior to removing the point 110 from calculations. The collision risk zone may include areas in which a risk for collision is elevated, such as, for example, near intersections, pedestrian crossings, parked vehicles 112 (e.g., disabled vehicles, double parked vehicles, etc.) detected via sensor data, or the like. Additionally, a collision risk zone may include areas with a high traffic density, higher average vehicle speeds, known construction zones, or the like. In various examples, if the vehicle computing system determines the point 110 is proximate to a potential collision zone, the vehicle computing system may determine to not remove the point 110 from calculations, regardless of whether the area is minimally affected by the removal.

In various examples, the vehicle computing system may be configured to detect one or more agents 114 in the environment 110. The vehicle computing system may detect the agent(s) 114 based on sensor data received from one or more sensors. In some examples, the sensor(s) may include sensors mounted on the vehicle 102, such as, for examples, cameras, motion detectors, LIDAR, RADAR, etc. In some examples, the sensor(s) may include one or more remote sensors, such as, for example sensors mounted on another vehicle 102, such as vehicle 102(2), and/or sensors 116 mounted in the environment 100. In various examples, vehicle 102(1) may be configured to transmit and/or receive data from vehicle 102(2) and/or sensors 116. The data may include sensor data, such data regarding agent(s) 114 identified in the environment 100. In various examples, the environment 100 may include sensors 116 for traffic monitoring, collision avoidance, or the like. In some examples, the sensors 116 may be mounted in the environment to provide additional visibility in an area of reduced visibility, such as, for example, in a blind or semi-blind intersection. For example, an intersection in the environment 100 may be determined to have a blind intersection, where approaching vehicles 102 may not be able to perceive agents 114 and/or other vehicles approaching from the left or right on the intersecting road. The intersection in the environment may thus include a sensor 116 to provide sensor data to an approaching vehicle 102(1) regarding an agent 114(1) approaching the intersection from the intersecting road. For another example, the vehicle 102(2) may have passed an intersection in the environment and detected agent 114(1) to the left as it passed through the intersection. The vehicle 102(2) may determine that vehicle 102(1) is approaching the intersection and may transmit sensor data regarding the agent 114(1) to the vehicle 102(1). The vehicle computing device of vehicle 102(1) may receive the sensor data and may be configured to perform collision avoidance measures prior to perception of the agent 114(1) by the sensors on vehicle 102(1).

In various examples, the vehicle computing system may receive the sensor data and may determine a type of agent 114 (e.g., classify the type of agent), such as, for example, whether the agent 114 is a car, such as agent 114(1), truck, motorcycle, moped, bicyclist, pedestrian, such as agent 114(2), or the like. In various examples, the vehicle computing system may determine one or more agent polygons based on the sensor data and/or the type of agent 114. In such examples, the agent polygon(s) may represent one or more possible paths that the agent may travel through the environment 100. In various examples, the vehicle computing system may determine one or more estimated agent trajectories 106 (trajectories 106) based on the sensor data and/or the type of agent 114. In some examples, the trajectories 106 may include any number of possible paths in which the agent 114 may travel from a current position (e.g., at the time of perception) and/or based on a direction of travel. In the illustrative example, the agent 114(1) may continue straight in a first trajectory 106(1), may turn right in a second trajectory 106(2), or may turn left in a third trajectory 106(3). However, in other examples, a number of trajectories may be any number more or less than three, including, but not limited to, a continuous representation of all possible trajectories. In some examples, the number of trajectories may vary depending on a variety of factors, such as the classification of the agent (e.g., type of agent), other stationary and/or dynamic objects, drivable surfaces, etc.

In various examples, the trajectories 106 may include trajectory samples 118, such as trajectory samples 118(1), 118(2) and 118(N). In some examples, the trajectory samples 118 may represent an average position of the agent 114 over time along the trajectory 106. In the illustrative example, the trajectory samples 118 represent a constant velocity of the agent 114 (e.g., substantially equally spaced apart). The constant velocity may be based on a perceived velocity, a known speed limit, or the like. In such examples, the trajectory samples 118(1), 118(2) and 118(N) may be represented at substantially equal distances from one another. In some examples, the trajectory samples 118 may represent varied velocities, accelerations, and/or decelerations of the agent 114. In such examples, the varied velocities may be based on a pre-defined velocity for a maneuver, such as, for example, slowing 10 mph less than the speed limit for a turn and accelerating back to the speed limit. Additionally, in such examples, the trajectory samples 118(1), 118(2) and 118(N) may be represented at varied distances from one another. In at least other examples, such trajectory samples 118 may be determined based on a predicted motion of the agent as determined by a prediction system.

The trajectory samples 118 may represent a center of the agent 114. The center of the agent 114 may include an estimated center of mass, an estimated center point of the agent, or the like. Based on the path polygon 104 of the vehicle 102 and the trajectories 106, the vehicle computing device may determine whether a potential collision zone 120 may exist between the vehicle 102(1) and the agent 114(1). In some examples, the collision zone 120 may exist between the vehicle 102(1) and the agent 114(1) if the path polygon 104 and a trajectory 106, such as 106(1), intersect. In the illustrative example, the vehicle computing device may determine that potential collision zones 120(1) and 120(2) may exist where path polygon 104 and trajectories 106(1) and 106(3) intersect in the intersection.

Additionally, the vehicle computing system may determine that a potential collision zone 120, such as collision zone 120(3), may exist between the vehicle 102(1) and the agent 114 based on a trajectory 106, such as trajectory 106(2), being within a threshold distance (e.g., 2 meters, 3 meters, 3 feet, 5 feet, etc.) of the path polygon 104. In some examples, the threshold distance may be based on a pre-defined distance. In various examples, the threshold distance may be determined based on a known or perceived width of the agent 114(1). In some examples, the threshold distance may be determined based on a known or perceived width of the agent 114(1) plus an agent buffer. The agent buffer may represent a safety buffer around the agent 114. In some examples, the agent buffer may be based, at least in part, on a buffer associated with the point pair position with respect to the vehicle 102(1), as discussed above. For example, if the points 110 of the point pair represent an outermost edge of the vehicle 102(1) plus 12 inches, the agent buffer may be smaller than if the points 110 of the point pair represent the outermost edge of the vehicle 102(1) plus two inches. In some examples, the agent buffer may be determined based on the type of agent 114. For example, a pedestrian agent 114(2) may have an agent buffer of 2.5 ft. radius around a center of the agent 114(2). For another example, an agent 114 identified as a motorcycle may have a two-foot agent buffer on either side of the center of the agent 114.

In various examples, the vehicle computing device may determine that the trajectory is within the threshold distance of the path polygon (or a point 110 thereof) and may expand the edges (e.g., width) of the trajectory from the trajectory sample (e.g., center of the agent) to a distance from the center of the agent. In some examples, the distance may be a known or perceived width of the agent. In some examples, the distance may include a known or perceived width of the agent plus the agent buffer. In some examples, the agent buffer may be based, at least in part, on a buffer associated with the point pair position with respect to the vehicle 102, as discussed above. The vehicle computing device may compare the expanded width of the agent trajectory 106 to the path polygon 104 (such as on the map 108) to determine whether a potential collision zone 120 exists. Based on a determination the path polygon 104 and the expanded width of the agent trajectory 106 and/or an agent polygon intersect and/or pass within a minimum allowable distance (e.g., 3 inches, 5 inches, 1 feet), the vehicle computing device may determine that the potential collision zone 120 exists. Based on a determination that the path polygon 104 and the expanded width of the agent trajectory 106 do not intersect and/or pass by more than the minimum allowable distance, the vehicle computing device may determine that a collision zone 120 does not exist. The minimum allowable distance may be based on whether passengers are in the vehicle, a width of the roads in the environment, passenger comfort and/or reaction, learned tolerances of passengers, local driving etiquette, or the like.

Figure 2:
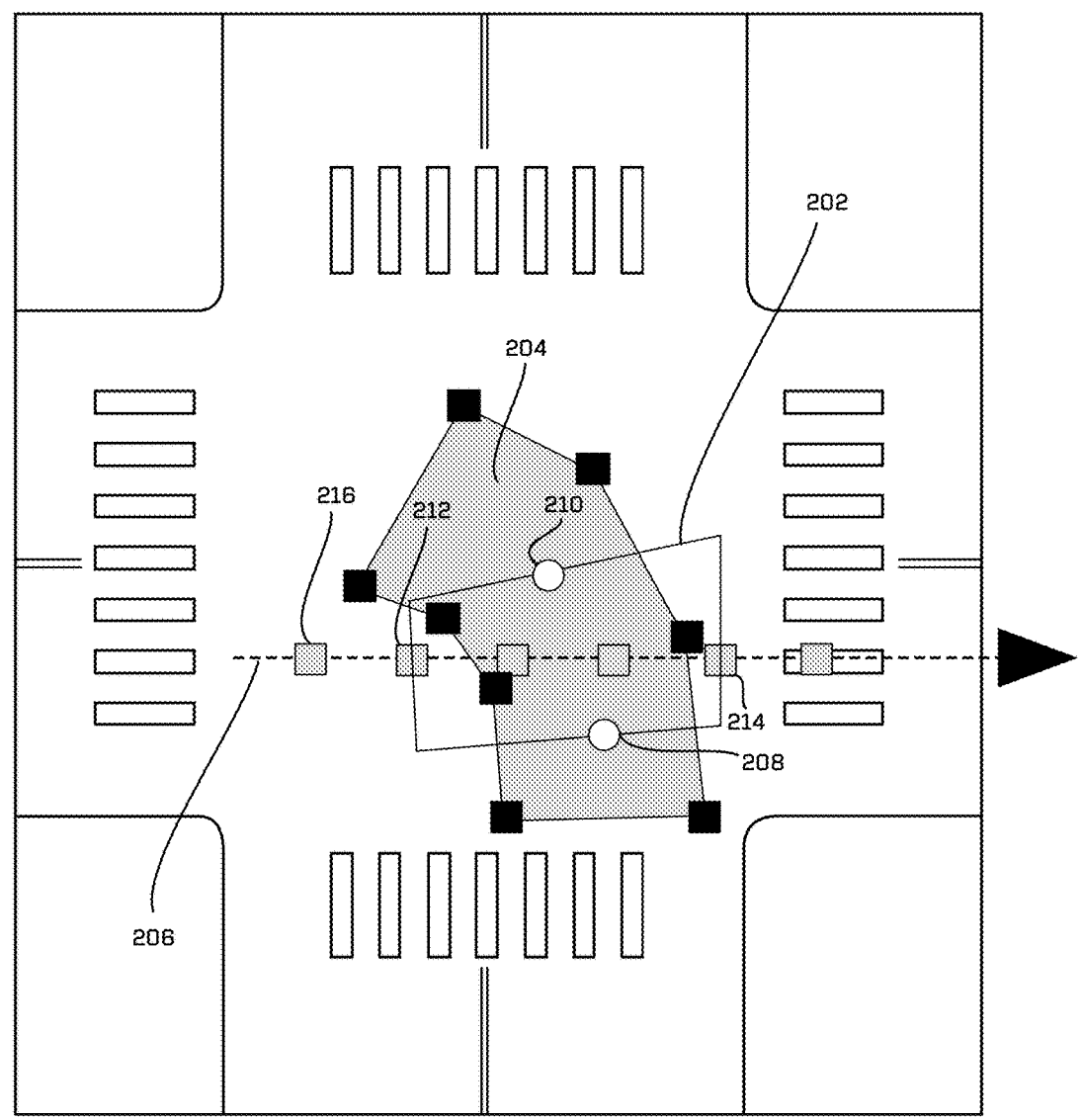
FIG. 2 is an illustration of an autonomous vehicle in an environment, in which a collision avoidance system of the autonomous vehicle may determine a potential collision zone between a path polygon representing a planned path of the autonomous vehicle and an estimated agent trajectory associated with an agent.

FIG. 2 is an illustration of an environment 200, such as environment 100, wherein a collision avoidance system of the autonomous vehicle may determine a potential collision zone 202, such as potential collision zone 120 between a path polygon 204, such as path polygon 104, representing a planned path of the autonomous vehicle and an estimated agent trajectory 206, such as trajectory 106, associated with an agent, such as agent 114.

In various examples, a vehicle computing system of the autonomous vehicle may be configured with the collision avoidance system which may determine the potential collision zone 202. The potential collision zone 202 may include four elements, a vehicle enter point 208, a vehicle exit point 210, an agent enter point 212, and an agent exit point 214. Each of the vehicle and agent enter and exit points may include a position and distance. The agent enter point 212 and agent exit point 214 may include trajectory samples 216, such as trajectory samples 118, along the trajectory 206 of the agent. In some examples, agent enter point 212 and agent exit point 214 may represent trajectory samples 216 in which a risk of collision does not exist. In various examples, an agent enter point 212 position may be determined by identifying the last trajectory sample 216 prior to an intersection (e.g., convergence) with the path polygon 204. In some examples, an agent exit point 214 position may be determined by identifying the first trajectory sample 216 after the intersection between the trajectory 206 and the path polygon 204. The distance associated with agent enter point 212 and the agent exit point 214 may be derived from the respective positions as a distance along the trajectory 206.

The vehicle computing device may determine vehicle enter point 208 and vehicle exit point 210 positions based on an offset distance before and after trajectory 206 (e.g., to the left and to the right of the trajectory 206). In some examples, the offset distance may be based on a width of the agent, the width of the agent plus a buffer, a buffer itself, or any other distance representative of a safe distance from the agent at which the vehicle will not collide. In some examples, the offset distance may include a distance measured from the trajectory 206. In some examples, the offset distance may include a distance measured along the path polygon 204

(e.g., vehicle path) before and after the trajectory 206. In various examples, the offset distance may be measured from the center of the path polygon. In some examples, the offset distance may be measured from a forward most point of the vehicle along the path polygon 204. In such examples, the offset distance may account for vehicle maneuvers (e.g., turns) and an affect thereof on a position of the vehicle.

In some examples, the offset distance may include a pre-defined distance (e.g., a constant distance) from the trajectory 206, such as, for example, based on a length of the vehicle. In various examples, the offset distance may be based on a known or perceived width of the agent and/or an agent buffer. In some examples, the offset distance before and after the trajectory may be the same or a different constant distance. For example, the vehicle enter point 208 may represent a position with a 10-foot offset distance before the trajectory 206 and the vehicle exit point 210 may represent a position with a 5-foot offset distance after the trajectory 206. For another example, the vehicle enter point 208 and the vehicle exit point 210 may represent positions with a 7-foot offset distance before and after the trajectory 206, respectively.

As will be discussed in further detail below with respect to FIGS. 3A, 3B, and 4, based on a determination of the bounds (e.g., agent enter point 212, agent exit point 214, vehicle enter point 208, vehicle exit point 210) of one or more potential collision zones 202 between the vehicle 102(1) and the agent 114(1), the vehicle computing system may apply a time-space overlap to each potential collision zone 202 to determine a risk of collision in the potential collision zone 202. The time-space overlap may include planned speeds associated with the vehicle and probable speeds associated with the agent. In some examples, the time-space overlap may be represented as a position cone of probable speeds at which the agent may travel through the environment 200 into and through the potential collision zone 202. In some examples, the time-space overlap may be represented as one or more probability density functions (PDFs) associated with probable positions of the agent based on time.

Figure 3A:
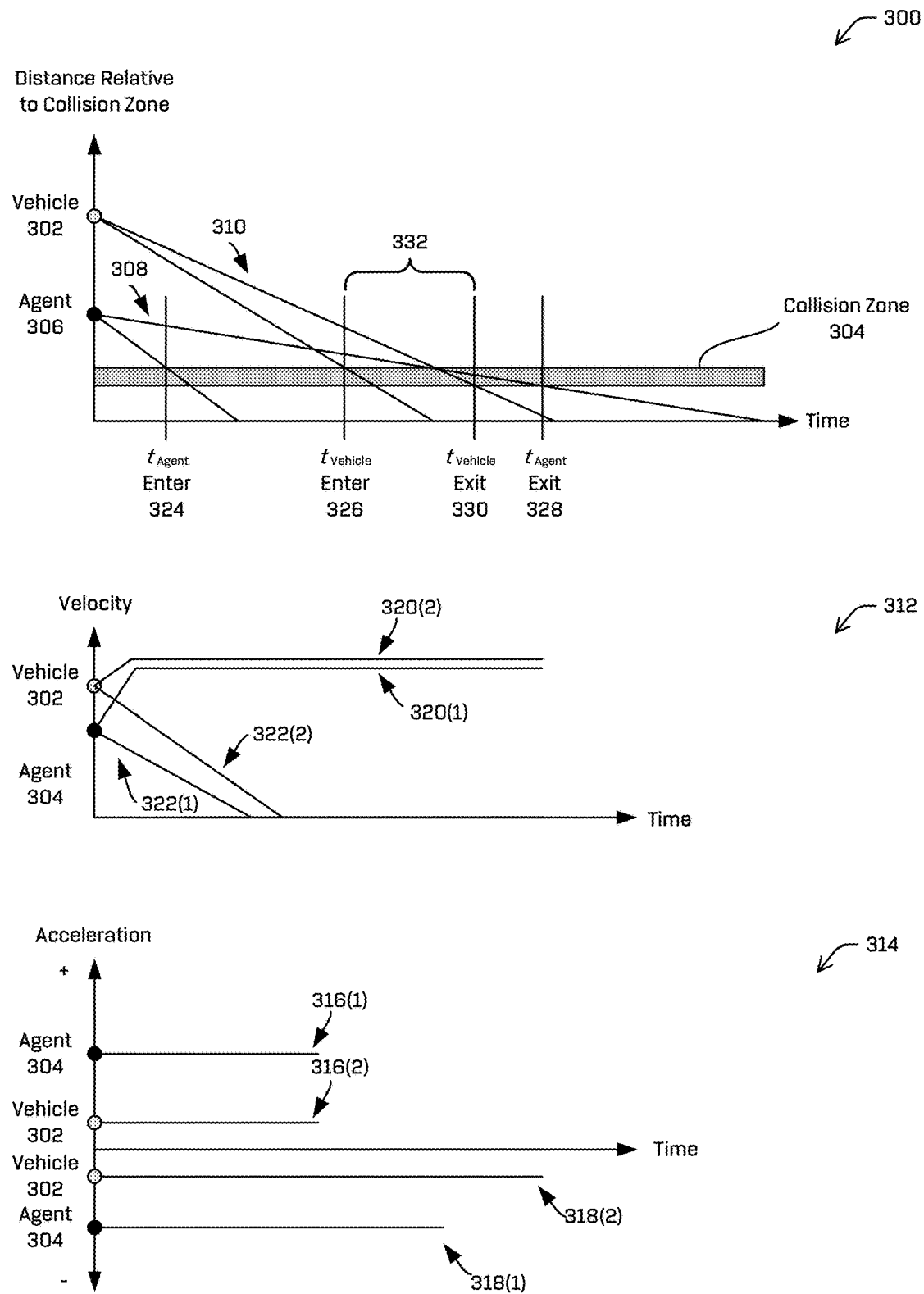
FIGS. 3A and 3B are illustrations of example time-space overlaps of position cones associated with agent trajectories and planned speeds of an autonomous vehicle relative to a potential collision zone, in which a collision avoidance system of the autonomous vehicle may determine a possible collision between the autonomous vehicle and an agent based on the time-space overlap, in accordance with embodiments of the disclosure.
Figure 3B:
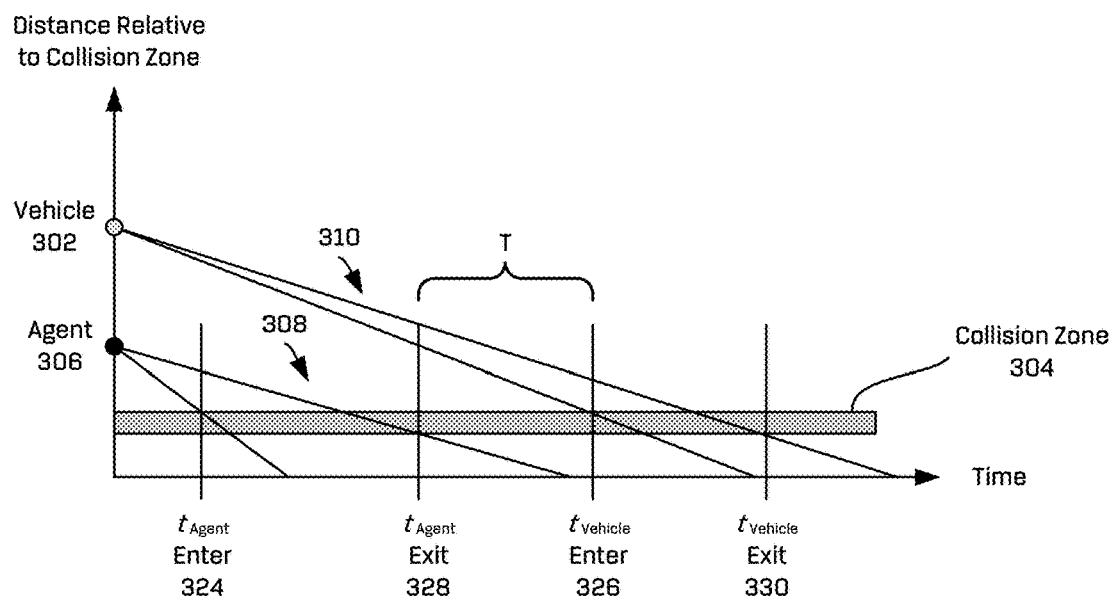

FIGS. 3A and 3B are illustrations of example time-space overlaps 300 (e.g., overlaps) represented as position cones associated with agent trajectories, such as trajectories 106, and planned speeds of an autonomous vehicle 302, such as vehicle 102, relative to a potential collision zone 304, such as potential collision zone 120, wherein a collision avoidance system of the autonomous vehicle 302 may determine a risk of collision between the autonomous vehicle 302 and an agent 306, such as agent 114, based on the time-space overlap 300.

FIG. 3A is an illustration of a time-space overlap 300 in which the collision avoidance system may determine a high risk of collision between the vehicle 302 and the agent 306 based on an agent position cone 308 associated with the agent 306 overlapping with a vehicle position cone 310 associated with the vehicle 302 along a planned path (e.g., path polygon). A risk and/or probability of collision may be determined based on an amount of overlap (e.g., time gap) between the vehicle position cone 310 and the agent position cone 308. A high risk (e.g., probability) of collision may include a probability of collision above a first threshold (e.g., 25%, 30%, 40%, etc.). A low risk of collision may include a probability of collision below a second threshold (e.g., 5%, 7%, 10%, etc.). A medium risk of collision may include a probability of collision between the first and second thresholds. In the illustrative example, the time-space overlap 300 includes a graphical representation of a distance relative to the potential collision zone 304 versus time.

In various examples, the vehicle computing system may determine the vehicle position cone 310 and the agent position cone 308. The vehicle position cone 310 may be determined based on probable velocities of the vehicle 302 along the planned path (e.g., path polygon) through the potential collision zone 204. The agent position cone 308 may be determined based on probable velocities of the agent 306 along a trajectory, such as trajectory 106. In FIG. 3A, the probable velocities of the vehicle 302 and the agent 306 may be illustrated as a velocity-time graph 312.

In various examples, the probable velocities illustrated in the velocity-time graph 312 may be derived from probable accelerations (e.g., positive and negative accelerations) of the vehicle 302 and the agent 306, respectively. In FIG. 3A, the probable accelerations may be illustrated as acceleration-time graph 314. The velocities and accelerations illustrated in the velocity-time graph 312 and the acceleration-time graph 314 are exaggerated for illustrative purposes and are not meant to be limiting in any way. In some examples, the velocity-time graph 312 and/or the acceleration-time graph 314 may be represented in logarithmic scale. Further, any behavior, whether aggressive, conservative, average, or otherwise may be modeled.

In the illustrative example in FIG. 3A, each of the vehicle 302 and the agent 306 have both positive accelerations 316(1) and 316(2) and negative accelerations 318(1) and 318(2), respectively. The positive accelerations 316 may be based on a fast-behavioral model (e.g., aggressive behavior). The negative accelerations 318 may be based on a slow-behavioral model (e.g., conservative behavior). In the illustrative example, the positive accelerations 316 and the negative accelerations 318 assume constant acceleration based on a current velocity and/or a road speed (e.g., speed limit, maximum known speed in the environment, etc.). In other examples, the positive accelerations 316 and the negative accelerations 318 may include varying accelerations. In various examples, the potential conservative and/or aggressive behaviors may be determined based on an initial velocity, a baseline velocity, a speed limit in the environment or portion thereof, or the like. In some examples, the potential conservative and/or aggressive behaviors may be based at least in part on a type and/or classification of agent 306. For example, conservative and/or aggressive behaviors of a pedestrian agent will differ from those of a vehicle. For another example, conservative and/or aggressive behaviors of a sports car will differ from those associated with a tractor-trailer.

In various examples, the positive acceleration 316 associated with the agent 306, depicted as 316(1), may be based on traffic laws, rules of the road, local driving etiquette, traffic patterns, semantic classification of the agent, or the like. In some examples, the positive acceleration 316(1) may represent a maximum amount of positive acceleration probable in the environment. In various examples, the negative acceleration 318(1) associated with the agent 306 may represent a maximum amount of negative acceleration probable in the environment, such as that based on the initial velocity.

In various examples, the vehicle computing system may determine a maximum velocity 320 and a minimum velocity 322 over time for the vehicle 302 and the agent 306, based at least in part on respective positive accelerations 316 and negative accelerations 318, as illustrated on the velocity-time graph 312. In various examples, the vehicle computing system may determine an entry time and an exit time associated with the vehicle enter point, vehicle exit point, agent enter point, and agent exit point, as discussed above with regard to FIG. 2, based on the respective maximum velocities 320 and minimum velocities 322.

As illustrated in the time-space overlap 300, the vehicle computing system may determine the agent position cone 308 and the vehicle position cone 310 respective to the potential collision zone 304. The agent position cones 308 and the vehicle position cone 310 may be based on an agent enter time 324, an agent exit time 328, a vehicle enter time 326, and a vehicle exit time 330 with respect to the potential collision zone 304. In various examples, the agent enter time 324 ($t_{Agent}$ Enter) and the vehicle enter time 326 ($t_{vehicle}$ Enter) may be associated with respective maximum velocities 320(1) and 320(2). In such examples, the entry times into the potential collision zone 304 may be associated with a most aggressive estimation of speed. In various examples, the agent exit time 328 ($t_{Agent}$ Exit) and the vehicle exit time 330 ($t_{vehicle}$ Exit) may be associated with respective minimum velocities 322(1) and 322(2). In such examples, the exit times into the potential collision zone 304 may be associated with a most conservative estimation of speed. By calculating the enter velocities using the aggressive model and the exit velocities using the conservative model, the collision avoidance system can conservatively expand the range of times that the agent and vehicle will be in the collision zone contemporaneously.

In the illustrative example of FIG. 3A, the vehicle computing device may determine, on the time-space overlap 300, that an overlap 332 between the vehicle 302 and the agent 306 exists in the potential collision zone 304. Based on the overlap 332, the vehicle computing device may determine that a risk of collision in the potential collision zone is high and that the vehicle computing device should cause the vehicle to perform an action to avoid collision. The action may include slowing the vehicle 302 to yield to the agent 306, stopping the vehicle 302 to yield to the agent 306, changing lanes left, or changing lanes right. In some examples, determining the action may include determining a safe stop position for the vehicle. In such examples, the safe stop position may include a position in which little or no risk or probability of collision may exist. Based on the determined action, and as will be discussed in further detail with respect to FIG. 5, the vehicle computing device may cause the vehicle 302 to perform the action. In various examples, responsive to determining to adjust a lateral position of the vehicle 302, such as in a lane change to the left or to the right, the vehicle computing device may again generate a path polygon, plot agent trajectories with respect to the path polygon, determine potential collision zones, and perform a time-space overlap to determine whether a collision risk may still exist after the action.

FIG. 3B is an illustration of a time-space overlap 300 in which the collision avoidance system may determine a low risk of collision between the vehicle 302 and the agent 306 based on an agent position cone 308 not overlapping with a vehicle position cone 310 along the planned path. Similar to the process described in FIG. 3A, the vehicle computing device may derive maximum and minimum velocities associated with the vehicle 302 and the agent 306 based on conservative and aggressive accelerations. The vehicle computing device may determine times associated with entry and exit points for the vehicle 302 (e.g., vehicle enter time 326 ($t_{vehicle}$ Enter) and the vehicle exit time 330 ($t_{vehicle}$ Exit)) and the agent 306 (e.g., agent enter time 324 ($t_{Agent}$ Enter) and the agent exit time 328 ($t_{Agent}$ Exit)) based on the derived velocities.

In the illustrative example of FIG. 3B, the vehicle computing device may determine, on the time-space overlap 300, that no overlap between the vehicle position cone 310 and the agent position cone 308 exists in the potential collision zone 304. Based on the lack of an overlap, the vehicle computing device may determine that a risk of collision in the potential collision zone is low. In some examples, the risk of collision may be determined to be low and/or to not exist if a time (T) between the agent exit time 328 and the vehicle enter time 326 or a time between a vehicle exit time 330 and an agent enter time 324 exceeds a threshold time (e.g., 10 seconds, 30 seconds, 1 minute, etc.). In such examples, the threshold time may be based on a margin of safety to avoid collision. In various examples, based on a determination that the risk of collision is low, the vehicle computing device may determine to continue along the planned path polygon at the planned speeds.

Figure 4:
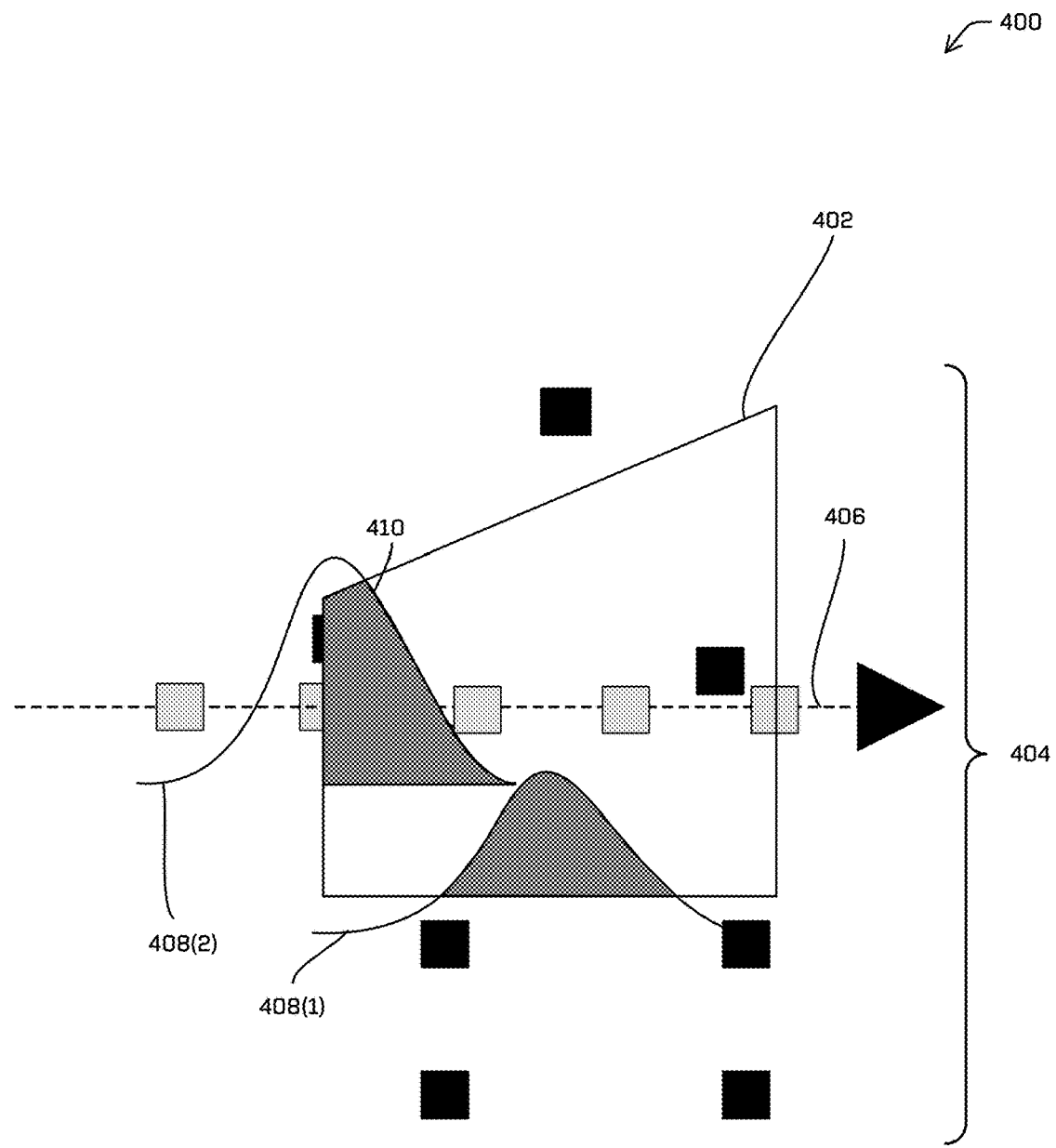
FIG. 4 is an illustration of a collision zone between a path polygon of an autonomous vehicle and an estimated agent trajectory, in which a collision avoidance system of the autonomous vehicle may determine a possible collision point between the autonomous vehicle and an agent based on one or more probability density functions of probable speeds and actions associated with the agent, in accordance with embodiments of the disclosure.

FIG. 4 is an illustration of a time-space overlap 400 (e.g., an overlap) on a potential collision zone 402 between a path polygon 404, such as path polygon 104, of a vehicle, such as vehicle 102 and an estimated agent trajectory 406, such as trajectory 106, wherein an improved collision avoidance system of the vehicle may determine a risk of collision between the vehicle and an agent (e.g., an object), such as agent 114, based on one or more probability density functions 408 of probable positions associated with the agent and/or the vehicle over time.

As discussed above, a vehicle computing device of the vehicle may perform a time-space overlap 400 on a determined potential collision zone 402 using the one or more probability density functions 408 associated with probable positions of the agent and/or the vehicle based on time. The probable positions of the agent and/or the vehicle may be derived from probable accelerations, and speeds derived therefrom. The probability density function(s) 408 may represent aggressive and conservative driving speeds, as well as uncertainties based on accelerations of the agent, such as those based on traffic laws, rules of the road, local driving etiquette, traffic patterns, semantic classification of the agent, or the like.

In the illustrative example, the probability density function(s) 408 are illustrated as two curves overlaid on the potential collision zone 402. Probability density function 408(1) may represent probable positions of the vehicle, and probability density function 408(2) may represent probable positions of the agent, or vice versa. In some examples, one or more probability density functions 408 associated with each of the vehicle and the agent may be convoluted into a single probability density function 408. In such examples, the probability density function 408 may represent a convolution of probable positions of both the agent and the vehicle, in a single distribution.

In various examples, the probability density function(s) 408 may represent a two-dimensional area associated with the agent and/or the vehicle. In some examples, the probability density function(s) 408 may represent a three-dimensional area associated with the agent and/or the area. In various examples, the total sum of the area under a curve (e.g., an integral) of a probability density function 408, such as probability density function 408(1) may equal 1. In some examples, the integral of the probability density function(s) 408 may be equal to the number of probability density functions 408. For example, in the illustrative example, the integral is equal to 2, representing the area under the curve of probability density function 408(1) and the area under the curve of probability density function 408(2).

In various examples, the vehicle computing device may determine whether some or all of at least one probability density function 408 are positioned within the potential collision zone 402. In such examples, the probability density function(s) 408 may be positioned in the potential collision zone 402 if at least part of the at least one probability density function 408 intersects and/or lays within the potential collision zone 402. In the illustrative example, at least a portion of probability density functions 408(1) and 408(2) intersect with the potential collision zone 402.

In various examples, based on a determination that the probability density function(s) 408 are positioned outside of and do not intersect with the potential collision zone 402, the vehicle computing device may determine that a risk of collision and/or probability of collision between the vehicle and the agent is low and/or does not exist. In some examples, based on a determination that at least a portion of one or more probability density functions 408 are positioned and/or intersect with the potential collision zone 402, the vehicle computing device may determine an overlap 410. The overlap 410 may be representative of an area under each curve (e.g., an integral) of the probability density function(s) 408 that overlaps with the potential collision zone 402.

In various examples, the vehicle computing device may determine a percentage of area of each probability density function 408 that intersects with the potential collision zone 402. In such examples, the vehicle computing device may partition the overlap 410 based on an area under a curve associated with each probability density function 408(1) and 408(2). In some examples, the vehicle computing device may determine a percentage of area of the overlap 410 compared to a number of probability density functions 408. For example, the vehicle computing device may determine an area associated with the overlap 410 as a percentage of two (e.g., an area equivalent to one for each of the two probability density functions 408).

In various examples, the vehicle computing device may determine a risk and/or probability of collision based on the percentage of area under one or more probability density functions 408 that intersect with the potential collision zone 402. In some examples, the risk and/or probability may be deemed high, medium, or low, based on the percentage of area. For example, less than a 15% area may be considered low risk, 16-30% area may be considered medium risk, and above 31% may be considered high risk.

In various examples, the vehicle computing device may determine whether the percentage of area under the curve(s) of the probability density function(s) 408 is less than a threshold percentage (e.g., 5%, 10%, 15%, 20%, etc.). In such examples, based on a determination that the percentage of area under the curve(s) of the probability density functions 408 is less than the threshold percentage, the vehicle computing device may determine that there is a low and/or no risk and/or probability of collision between the vehicle and the agent. In some examples, the vehicle computing device may determine whether the percentage of area under the curve(s) of the probability density function(s) 408 is exceeds a threshold percentage (e.g., 25%, 50%, 75%, etc.). In such examples, based on a determination that the percentage of area under the curve(s) of the probability density functions 408 is greater than the threshold percentage, the vehicle computing device may determine that there is a high risk and/or probability of collision between the vehicle and the agent. In various examples, a high risk and/or probability of collision may be a risk that exceeds an acceptable amount of risk.

In some examples, based on a determination of risk (e.g., high, medium, or low risk), the vehicle computing device may determine an action to take. The action may include slowing the vehicle to yield to the agent, stopping the vehicle to yield to the agent, changing lanes left, or changing lanes right. In some examples, determining the action may include determining a safe stop position for the vehicle. In such examples, the safe stop position may include a position in which little or no risk or probability of collision may exist. In at least some examples, the action may be based, at least in part, on the determined combined probability after integration. As a non-limiting example, a vehicle speed may be adjusted as a function of probability of collision. Based on the determined action, and as will be discussed in further detail with respect to FIG. 5, the vehicle computing device may cause the vehicle to perform the action. In various examples, responsive to determining to adjust a lateral position of the vehicle, such as in a lane change to the left or to the right, the vehicle computing device may again generate a path polygon, plot agent trajectories with respect to the path polygon, determine potential collision zones, and perform a time-space overlap to determine whether a collision risk may still exist after the action.

In various examples, the vehicle computing device may be configured to cause the vehicle to perform the action based at least on a display of intent. The display of intent may represent a signal to agents and/or other vehicles in the environment of a follow-up action that the vehicle will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk of collision. In such examples, the follow-up action may be chosen based on a determination of the very low or zero risk of collision. For example, a vehicle computing device may determine that the front-facing portion of a vehicle may enter a collision zone in an intersection without risk of collision with an agent. The vehicle computing device may thus cause the vehicle to enter the collision zone in the intersection to signal an intent to turn left in the intersection.

Figure 5:
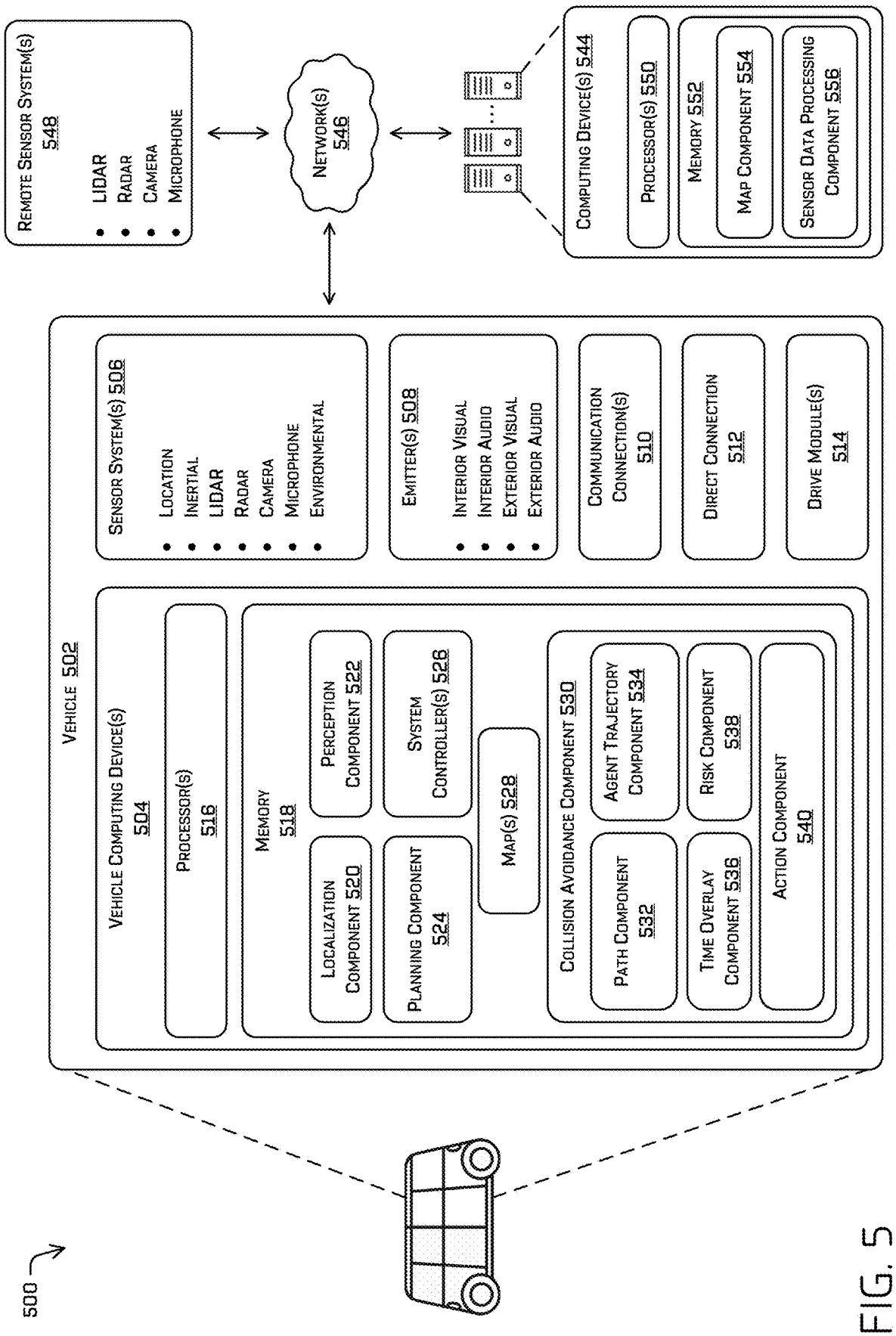
FIG. 5 is a block diagram of an example system for implementing the techniques described herein.

FIG. 5 is a block diagram of an example system 500 for implementing the techniques described herein. In at least one example, the system 500 may include a vehicle 502, such as vehicle 102.

The vehicle 502 may include a vehicle computing device 504, one or more sensor systems 506, one or more emitters 508, one or more communication connections 510, at least one direct connection 512, and one or more drive modules 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, a perception component 522, a planning component 524, one or more system controllers 526, one or more maps 528, and a collision avoidance component 530 including a path component 532, an agent trajectory component 534, a time overlap component 536, a risk component 538, and an action component 540. Though depicted in FIG. 4 as residing in the memory 518 for illustrative purposes, it is contemplated that the localization component 520, a perception component 522, a planning component 524, one or more system controllers 526, one or more maps 528, and a collision avoidance component 530 including a path component 532, an agent trajectory component 534, a time overlap component 536, a risk component 538, and an action component 540 may additionally, or alternatively, be accessible to the vehicle 502 (e.g., stored on, or otherwise accessible by, memory remote from the vehicle 502, such as, for example, on memory 542 of a remote computing device 544).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a path polygon associated with the vehicle path, as discussed herein.

In some instances, the perception component 522 may include functionality to perform object detection, segmentation, and/or classification. In some examples, the perception component 522 may provide processed sensor data that indicates a presence of an agent (e.g., entity) that is proximate to the vehicle 502 and/or a classification of the agent as an agent type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., agents) in an environment. For example, a prediction component may generate one or more predicted trajectories for agents within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive module(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the maps 528. That is, the maps 528 may be used in connection with the localization component 520, the perception component 522, and/or the planning component 524 to determine a location of the vehicle 502, detect objects in an environment, and/or generate routes and/or trajectories to navigate within an environment.

In some examples, the one or more maps 528 may be stored on a remote computing device(s) (such as the computing device(s) 544) accessible via network(s) 546. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a collision avoidance component 530. The collision avoidance component may include a path component 532 configured to generate a point path polygon (path polygon) of a path of the vehicle through an environment. In various examples, the path component 532 may receive planning and/or map data from the planning component 524 and/or the map(s) 528 to determine the path of the vehicle.

The path polygon may include a plurality of points and may represent a two-dimensional representation of a planned path of the vehicle 502 through the environment. In various examples, the path polygon may be represented as pairs of points. The pairs of points may represent a left boundary and a right boundary of the vehicle 502. In some examples, the left and right boundaries of the vehicle may represent a minimum distance, such as, for example, a width of the vehicle 502. For example, the left and right boundaries may represent a left and right outermost edge of the vehicle, respectively. In some examples, the left and right boundaries (e.g., minimum distance) may additionally include a buffer outside the outermost edge of the vehicle.

In various examples, a position of the left and right points of a point pair may be individually adjusted based on a maneuver of the vehicle 502, such as, for example a turn. In such examples, the path component 532 may adjust a left point and/or a right point of the point pair outward a distance (e.g., 3 inches, 5 inches, 8 inches, etc.) based on the maneuver. In various examples, the left point and/or the right point may be adjusted outward the distance based on a radius of curvature associated with a turn.

In various examples, the path component 532 may generate the path polygon. In some examples, the path polygon may include pairs of points and/or single points. In some examples, the pairs of points and/or single points may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a maneuver of the vehicle 502, a speed of the vehicle 502, a density of traffic in the environment, and/or other factors impacting the vehicle 502.

In various examples, the path component 532 may be configured to perform compression techniques on the path polygon. In such examples, the path component 532 may be configured to improve the speed and function of the vehicle computing device itself and the collision avoidance component by removing points from calculations. In some examples, the path component 532 may determine that removing a point may have a no effect or substantially no effect on an area associated with the path polygon. The area of the path polygon may be a two-dimensional area (e.g., as represented in meters$^2$, feet$^2$, inches$^2$, etc.) of the planned (e.g., intended) path of the vehicle 502 through the environment. In some examples, the vehicle computing system may determine that removing the point may modify the area less than a threshold amount. The threshold amount may be a percentage of the total area (e.g., 3%, 5%, 10%, etc.) and/or it may be a pre-defined amount of area (e.g., 2.5 meters$^2$, 2 feet$^2$, 6 inches$^2$ etc.).

In some examples, the path component 532 may determine whether a point in the path polygon is proximate to (e.g., within 50 feet, 15 meters, 25 meters, etc.) a collision risk zone prior to removing the point from calculations. The collision risk zone may include areas in which a risk for collision is elevated, such as, for example, near intersections, pedestrian crossings, parked vehicles (e.g., disabled vehicles, double parked vehicles, etc.) detected via sensor data, or the like. Additionally, a collision risk zone may include areas with a high traffic density, known construction zones, or the like. In various examples, if the vehicle computing system determines the point is proximate to a potential collision zone, the vehicle computing system may determine to not remove the point from calculations, regardless of whether the area is minimally affected by the removal.

In some examples, the collision avoidance component 530 may include an agent trajectory component 534. The agent trajectory component 534 may be configured to determine one or more possible trajectories associated with an agent in an environment in which the vehicle 502 is operating. In some examples, the trajectories may include any number of possible paths in which the agent 114 may travel from a current position (e.g., at the time of perception) and/or based on a direction of travel. For example, approaching an intersection, an agent may turn right, continue straight, turn left, or conduct a U-turn. The trajectories may include illustrations of each of the aforementioned possible paths of the agent. In some examples, the agent trajectory component 534 may receive data from the perception component 522 regarding agent(s) in the environment. In some examples, the agent trajectory component 534 may determine that an agent is within a threshold distance (e.g., one block, 200 meters, 300 feet, etc.) of the vehicle 502. Based on the determination that the agent is within the threshold distance to the vehicle, the agent trajectory component 534 may determine the trajectories associated with the agent. In some examples, the agent trajectory component 534 may be configured to determine the possible trajectories of each detected agent in the environment.

In various examples, the trajectories may include trajectory samples, or points representing a center of the agent. The center of the agent may include an estimated center of mass, an estimated center point of the agent, or the like. In some examples, the trajectory samples represent a constant velocity of the agent (e.g., substantially equally spaced apart). The constant velocity may be based on a perceived velocity, a known speed limit, or the like. In some examples, the trajectory samples may represent varied velocities of the agent. In such examples, the varied velocities may be based on a pre-defined velocity for a maneuver, such as, for example, slowing to 20 mph for a turn and accelerating back to the speed limit.

In various examples, the agent trajectory component 534 may compare the trajectory samples and/or the associated trajectories with the determined path polygon to determine whether a potential collision zone may exist in the environment. A potential collision zone may include an area in which, based on the path polygon and the trajectory, a collision between the vehicle 502 and the agent may exist. In at least some examples, the agent trajectory may be used to calculate an agent polygon. In such examples, a collision zone may be defined by the overlapping area between the agent polygon and the path polygon.

In some examples, the potential collision zone may exist between the vehicle 502 and the agent if the path polygon and a trajectory associated with the agent intersect. In various examples, the agent trajectory component 534 may determine that the potential collision zone may exist between the vehicle 502 and the agent based on a trajectory and/or a trajectory sample associated with the agent being within a threshold distance (e.g., 2 feet, 3 feet, 4 meters, 5 meters, etc.) of the path polygon. In some examples, the threshold distance may be based on a pre-defined distance. In various examples, the threshold distance may be determined based on a known or perceived width of the agent. In some examples, the threshold distance may be determined based on a known or perceived width of the agent plus an agent buffer. The agent buffer may represent a safety buffer around the agent. In some examples, the agent buffer may be based, at least in part, on a buffer associated with the point pair position with respect to the vehicle 502, as discussed above.

In various examples, the agent trajectory component 534 may determine that the trajectory is within the threshold distance of the path polygon and may expand the edges of the trajectory from the trajectory sample (e.g., center of the agent) to a distance from the center of the agent. In some examples, the distance may be a known or perceived width of the agent. In some examples, the distance may include a known or perceived width of the agent plus an agent buffer. The agent buffer may represent a safety buffer around the agent. In some examples, the agent buffer may be based, at least in part, on a buffer associated with the point pair position with respect to the vehicle 502, as discussed above. The agent trajectory component 534 may compare the expanded width of the agent trajectory to the path polygon (such as on the map) to determine whether a potential collision zone exists. If the path polygon and the expanded width of the agent trajectory intersect and/or pass within a minimum allowable distance (e.g., 3 inches, 5 inches, 1 feet), the agent trajectory component 534 may determine that the potential collision zone exists. If the path polygon and the expanded width of the agent trajectory do not intersect and/or pass by more than the minimum allowable distance, the agent trajectory component 534 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the agent trajectory component 534 may be configured to determine the bounds of the potential collision zone. The potential collision zone may include four elements, a vehicle enter point, a vehicle exit point, an agent enter point, and an agent exit point. Each of the vehicle 502 and agent enter and exit points may include a position and distance. The agent entry point and agent exit point may include trajectory samples, such as trajectory samples, along the trajectory of the agent. In some examples, agent entry point and agent exit point may represent trajectory samples in which a risk of collision does not exist. In various examples, an agent enter point position may be determined by identifying the last trajectory sample associated with the agent trajectory prior to an intersection (e.g., convergence) with the path polygon. In some examples, an agent exit point position may be determined by identifying the first trajectory sample associated with the agent trajectory after the convergence between the trajectory and the path polygon. The distance associated with agent enter point and the agent exit point may be derived from the respective positions as a distance along the trajectory.

The vehicle computing device may determine vehicle enter point and vehicle exit point positions based on an offset distance before and after trajectory. In some examples, the offset distance may include a distance measured perpendicular to the trajectory. In some examples, the offset distance may include a distance measured along the path polygon (e.g., vehicle path) before and after the trajectory. In various examples, the offset distance may be measured from the center of the path polygon. In some examples, the offset distance may be measured from a forward most point of the vehicle along the path polygon. In such examples, the offset distance may account for vehicle maneuvers (e.g., turns) and an affect thereof on a position of the vehicle.

In some examples, the offset distance may include a pre-defined distance (e.g., a constant distance) from the trajectory, such as, for example, based on a length of the vehicle. In some examples, the offset distance before and after the trajectory may be the same or a different constant distance. For example, the vehicle enter point may represent a position with an 8-foot offset distance before the trajectory and the vehicle exit point may represent a position with a 6-foot offset distance after the trajectory.

In various examples, the time overlap component 536 may be configured to apply a time-space overlap onto the potential collision zones (bounds thereof, such as the vehicle and agent enter and exit points). In various examples, the time-space overlap may be represented as position cones associated with agent trajectories and vehicle 502 trajectories. In various examples, the time overlap component 536 may be configured to determine a vehicle position cone and an agent position cone. The vehicle position cone may be determined based on probable velocities of the vehicle along the planned path (e.g., path polygon) through the potential collision zone. The agent position cone may be determined based on probable velocities of the agent along the trajectory associated with the potential collision zone.

In various examples, the probable velocities of the agent may be derived from probable accelerations (e.g., positive and negative accelerations) of the agent. The accelerations may include positive accelerations based on a fast-behavioral model (e.g., aggressive behavior) and negative accelerations based on a slow-behavioral model (e.g., conservative behavior). In various examples, the positive accelerations associated with the agent may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the agent may represent a maximum amount of negative acceleration probable in the environment, such as that based on the initial velocity.

In various examples, the time overlap component 536 may determine a maximum velocity and a minimum velocity over time for the vehicle 502 and the agent, based on respective positive accelerations and negative accelerations. In various examples, the time overlap component 536 may determine an entry time and an exit time associated with the vehicle enter point, vehicle exit point, agent enter point, and agent exit point based on the respective maximum velocities and minimum velocities.

In various examples, time overlap component 536 may determine the agent position cone and the vehicle position cone respective to the potential collision zone. The agent position cones and the vehicle position cone may be based on an agent entry time, an agent exit time, a vehicle entry time, and a vehicle exit time with respect to the potential collision zone. In various examples, the agent entry time and the vehicle entry time may be associated with respective maximum velocities. In such examples, the entry times into the potential collision zone may be associated with a most aggressive estimation of speed. In various examples, the agent exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the agent based on time. The probable positions of the agent may be derived from probable accelerations, and speeds derived therefrom and/or outputs of other systems or subsystems (e.g., a prediction system, which may be, for example, a subsystem of the perception component 522). The probability density functions may represent aggressive and conservative driving speeds, as well as uncertainties based on accelerations of the agent, such as those based on traffic laws, rules of the road, local driving etiquette, traffic patterns, semantic classification of the agent, or the like. The probability density functions may represent two-dimensional area or three-dimensional areas associated with the agent. The total sum of the area under a curve of a probability density function may equal 1.

In various examples, the risk component 538 may determine a risk of collision based on the time-space overlaps determined by the time overlap component 536. In some examples, the risk of collision may be based on an overlap between position cones with respect to the potential collision zone. In such examples, based on the overlap between position cones (i.e., agent enter time into the potential collision zone is before vehicle exit time or vehicle enter time into the potential collision zone is before agent exit time), the risk component 538 may determine that a risk of collision may be high. In some examples, the degree of risk (e.g., high, medium, low) may be based on an amount of overlap (e.g., time gap) between the position cones. In some examples, the amount of overlap may include a percentage of the agent position cone, and/or a percentage of the vehicle position cone. For example, an overlap of 10% of each of the agent position cone and the vehicle position cone may include to a low risk of collision. For another example, an overlap of 15% of the vehicle position cone over the agent position cone may include a medium risk of collision. In various examples, the risk component 538 may determine that no risk of collision exists based on a determination that the agent position cone and the vehicle position cone do not overlap.

In various examples, the risk component 538 may determine whether at last part of a probability density function is positioned within (e.g., intersects and/or lays within) the determined potential collision zone. In various examples, based on a determination that the probability density function is positioned outside of and does not intersect with the potential collision zone, the risk component 538 may determine that a risk of collision between the vehicle and the agent is low and/or does not exist. In some examples, based on a determination that at least a portion of the probability density function is positioned and/or intersects with the potential collision zone, the risk component 538 may determine an overlap. The overlap may be representative of an area under each curve of the probability density functions that overlap with the potential collision zone.

In various examples, the risk component 538 may determine a percentage of area of the probability density functions that intersects with the potential collision zone and may determine a risk of collision based on the percentage of area. In some examples, the risk may be deemed high, medium, or low, based on the percentage of area. For example, less than a 29% area may be considered low risk, 30-40% area may be considered medium risk, and above 41% may be considered high risk.

In various examples, the risk component 538 may determine whether the percentage of area under the curve(s) of the probability density function(s) is less than a threshold percentage (e.g., 5%, 15%, 20%, etc.). In such examples, based on a determination that the percentage of area under the curve(s) of the probability density functions is less than the threshold percentage, the vehicle computing device may determine that there is a low and/or no risk of collision between the vehicle and the agent. In some examples, the risk component 538 may determine whether the percentage of area under the curve(s) of the probability density function(s) is exceeds a threshold percentage (e.g., 25%, 50%, 75%, etc.). In such examples, based on a determination that the percentage of area under the curve(s) of the probability density functions is greater than the threshold percentage, the risk component 538 may determine that there is a high risk of collision between the vehicle and the agent. In various examples, a high risk of collision may be a risk that exceeds an acceptable amount of risk.

In various examples, the action component 540 may, based on a determination of risk (e.g., high, medium, or low risk), determine an action to take. The action may include slowing the vehicle to yield to the agent, stopping the vehicle to yield to the agent, changing lanes left, or changing lanes right. Based on the determined action, the vehicle computing device 504, such as through the system controller(s) 526, may cause the vehicle to perform the action. In at least some examples, such an action may be based on the probability of collision, as described in detail above. In various examples, responsive to determining to adjust a lateral position of the vehicle, such as in a lane change to the left or to the right, the collision avoidance component 530 may again generate a path polygon, plot agent trajectories with respect to the path polygon, determine potential collision zones, and perform a time-space overlap to determine whether a collision risk may still exist after the action.

In various examples, the action component 540 may be configured to cause the vehicle to perform the action based at least on a display of intent. The display of intent may represent a signal to agents and/or other vehicles in the environment of a follow-up action that the vehicle will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk of collision. In such examples, the follow-up action may be chosen based on a determination of the very low or zero risk of collision. For example, a collision avoidance component 530 may determine that the front-facing portion of a vehicle 502 may enter a collision zone in an intersection without risk of collision with an agent. The collision avoidance component 530 may thus cause the vehicle 502 to enter the collision zone in the intersection to signal an intent to turn left in the intersection.

As can be understood, the components discussed herein (e.g., the localization component 520, the perception component 522, the planning component 524, the one or more system controllers 526, the one or more maps 228, the collision avoidance component 530 including the path component 532, the agent trajectory component 534, the time overlap component 536, the risk component 538, and the action component 540 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 518 (and the memory 542, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 506 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the LIDAR sensors may include individual LIDAR sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally or alternatively, the sensor system(s) 506 may send sensor data, via the one or more networks 546, to the one or more computing device(s) 544 at a particular frequency, after a lapse of a predetermined period of time, in near real-time, etc.

The vehicle 502 may also include one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connection(s) 510 that enable communication between the vehicle 502 and one or more other local or remote computing device(s). For instance, the communication connection(s) 510 may facilitate communication with other local computing device(s) on the vehicle 502 and/or the drive module(s) 514. Also, the communication connection(s) 510 may allow the vehicle to communicate with other nearby computing device(s) (e.g., computing device(s) 544, other nearby vehicles, etc.) and/or one or more remote sensor system(s) 548 for receiving sensor data.

The communications connection(s) 510 may include physical and/or logical interfaces for connecting the vehicle computing device 504 to another computing device or a network, such as network(s) 546. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive modules 514. In some examples, the vehicle 502 may have a single drive module 514. In at least one example, if the vehicle 502 has multiple drive modules 514, individual drive modules 514 may be positioned on opposite ends of the vehicle 502 (e.g., the front and the rear, etc.). In at least one example, the drive module(s) 514 may include one or more sensor systems to detect conditions of the drive module(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 may also include one or more communication connection(s) that enable communication by the respective drive module with one or more other local or remote computing device(s).

In at least one example, the direct connection 512 may provide a physical interface to couple the one or more drive module(s) 514 with the body of the vehicle 502. For example, the direct connection 512 may allow the transfer of energy, fluids, air, data, etc. between the drive module(s) 514 and the vehicle. In some instances, the direct connection 512 may further releasably secure the drive module(s) 514 to the body of the vehicle 502.

In at least one example, the localization component 520, the perception component 522, the planning component 524, the one or more system controllers 526, the one or more maps 528, and the collision avoidance component 530 and various components thereof, may process sensor data, as described above, and may send their respective outputs, over the one or more network(s) 546, to the computing device(s) 544. In at least one example, the localization component 520, the perception component 522, the planning component 524, the one or more system controllers 526, the one or more maps 528, and the collision avoidance component 530 may send their respective outputs to the computing device(s) 544 at a particular frequency, after a lapse of a predetermined period of time, in near real-time, etc.

In some examples, the vehicle 502 may send sensor data to the computing device(s) 544 via the network(s) 546. In some examples, the vehicle 502 may receive sensor data from the computing device(s) 544 via the network(s) 546. The sensor data may include raw sensor data and/or processed sensor data and/or representations of sensor data. In some examples, the sensor data (raw or processed) may be sent and/or received as one or more log files.

The computing device(s) 544 may include processor(s) 550 and a memory 552 storing a map component 554 and a sensor data processing component 546. In some examples, the map component 554 may include functionality to generate maps of various resolutions. In such examples, the map component 554 may send one or more maps to the vehicle computing device 504 for navigational purposes. In various examples, the sensor data processing component 556 may be configured to receive data from one or more remote sensors, such as sensor systems 506 and/or remote sensor system(s) 548. In some examples, the sensor data processing component 556 may be configured to process the data and send processed sensor data to the vehicle computing device(s) 504, such as for use by the collision avoidance component 530. In some examples, the sensor data processing component 556 may be configured to send raw sensor data to the vehicle computing device(s) 504.

The processor(s) 516 of the vehicle 502 and the processor(s) 550 of the computing device(s) 544 may be any suitable processor capable of executing instructions to process data and perform operations as described herein. By way of example and not limitation, the processor(s) 516 and 550 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 552 are examples of non-transitory computer-readable media. The memory 518 and 552 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and 552 may include at least a working memory and a storage memory. For example, the working memory may be a high-speed memory of limited capacity (e.g., cache memory) that is used for storing data to be operated on by the processor(s) 516 and 550. In some instances, the memory 518 and 552 may include a storage memory that may be a lower-speed memory of relatively large capacity that is used for long-term storage of data. In some cases, the processor(s) 516 and 550 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 544 and/or components of the computing device(s) 544 may be associated with the vehicle 502. That is, the vehicle 502 may perform one or more of the functions associated with the computing device(s) 544, and vice versa.

Figure 6:
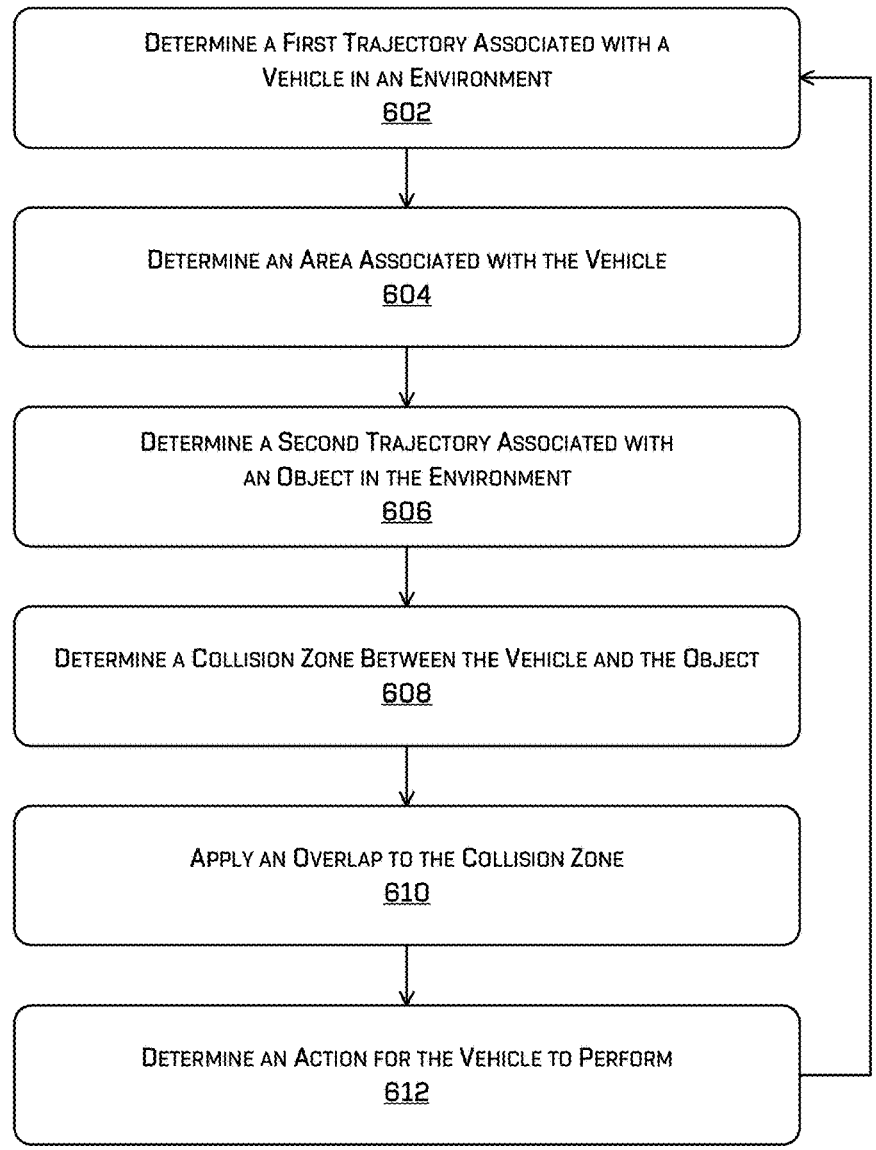
FIG. 6 depicts an example process for determining an action to perform to avoid a collision between an autonomous vehicle and an object in an environment, in accordance with embodiments of the disclosure.
Figure 7:
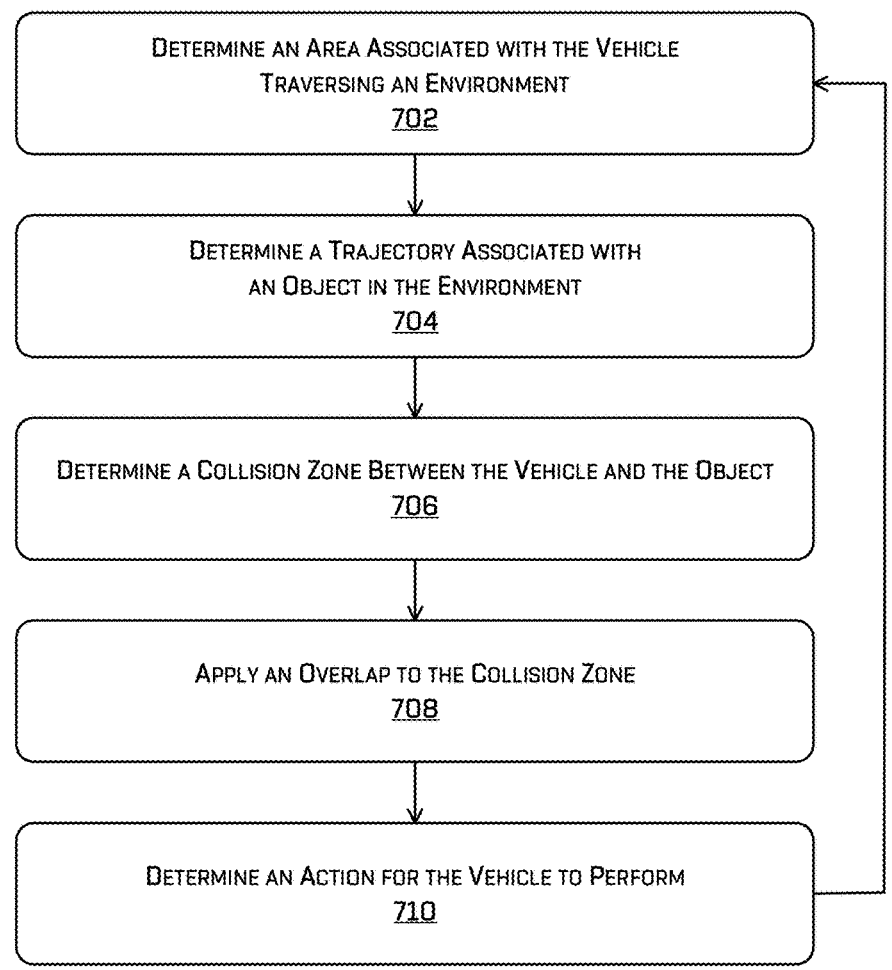
FIG. 7 depicts an example process for determining an action to perform to avoid a collision between a vehicle and an object in an environment, in accordance with embodiments of the disclosure.

FIGS. 6 and 7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 depicts an example process 600 for determining an action to perform to avoid a collision between a vehicle and an object in an environment, in accordance with embodiments of the disclosure. For example, some or all of the process 600 may be performed by one or more components in FIG. 5, as described herein. For example, some or all of the process 600 may be performed by the vehicle computing device(s) 504.

At operation 602, the process may include determining a first trajectory associated with a vehicle in an environment. The first trajectory may be based on a planned path of the vehicle in the environment. In some examples, the planned path may be a path or route of travel through the environment that the vehicle is intended to take, such as based on a route stored in a memory of a vehicle computing device.

At operation 604, the process may include determining an area associated with the vehicle. In various examples, the area may include an area associated with a path of the vehicle. In some examples, the area may include an area associated with a path polygon of the vehicle. In such examples, the process may include generating the path polygon associated with a path of a vehicle. The area and/or the path polygon may have associated therewith a plurality of points. In some examples, the area and/or the path polygon may represent a planned path of the vehicle through the environment. In various examples, the path polygon may be represented as pairs of points. The points may represent a left boundary and a right boundary of the vehicle. In some examples, the left and right boundaries of the vehicle may represent a minimum distance, such as, for example, a width of the vehicle. In some examples, the left and right boundaries (e.g., minimum distance) may additionally include a buffer outside the outermost edge of the vehicle. For example, a left point of a point pair may represent a left outermost boundary of the vehicle plus 3 inches and a right point of the point pair may represent a right outermost boundary of the vehicle plus 3 inches.

In various examples, a position of the left and right points of a point pair may be individually adjusted based on a maneuver of the vehicle, such as, for example a turn. In such examples, a left point, such as left point or right point, such as right point of the point pair may be adjusted outward a distance (e.g., 2 inches, 4 inches, 6 inches, etc.) based on the maneuver. In various examples, the left or the right points may be adjusted outward the distance based on a radius of curvature associated with a turn.

The points may be determined at consistent intervals (e.g., 0.2 sec. intervals, 0.5 sec. intervals, etc.) and/or varying intervals. In various examples, the points may be determined at equal distances from one another. In such examples, each left/right point of a point pair may be at a pre-defined distance (e.g., 1 meter, 3 feet, 18 inches, etc.) from the next left/right point of the point pair. In some examples, the pairs of points may be represented at different distances in length from one another. In various examples, the distances may be determined based on a maneuver of the vehicle, a speed of the vehicle, a density of traffic in the environment, and/or other factors impacting the vehicle.

In various examples, the vehicle computing system may be configured to perform compression techniques on the path polygon. In some examples, the vehicle computing system may determine that removing a point may have little effect or substantially no effect on an area associated with the path polygon 104. The area of the path polygon may be a two-dimensional area (e.g., meters$^2$, feet$^2$, inches$^2$, etc.) of the planned (e.g., intended) path of the vehicle through the environment. In some examples, the vehicle computing system may determine that removing the point may modify the area less than a threshold amount. The threshold amount may be a percentage of the total area (e.g., 3%, 5%, 10%, etc.) and/or it may be a pre-defined amount of area (e.g., 2.5 meters$^2$, 2 feet$^2$, 6 inches$^2$ etc.). Additionally, or in the alternative, a determination to remove a point may be based on determined location of the point with respect to a collision risk zone. In such examples, if the point is proximate to (e.g., within 30 feet, 15 meters, 30 meters, etc.) or within a threshold distance of a collision risk zone, the vehicle computing device may determine to not remove the point. The collision risk zone may include areas in which a risk for collision is elevated, (e.g., near intersections, pedestrian crossings, parked vehicles, or the like), areas with a high traffic density, known construction zones, etc.

At operation 606, the process may include determining a second trajectory associated with an object in the environment. The vehicle computing device may determine the second trajectory based on sensor data from one or more sensors of the vehicle and/or one or more remote sensors. In some examples, the second trajectory may include a possible path in which an object may travel from a current position (e.g., at the time of perception) and/or based on a direction of travel. In various examples, the second trajectory may include trajectory samples. The trajectory samples may represent a center of the agent. The center of the agent may include an estimated center of mass, an estimated center point of the agent, or the like.

At operation 608, the process may include determining a potential collision zone between the vehicle and the object. A determination of the potential collision zone may be based at least in part on the object trajectory and the vehicle area and/or path polygon. In some examples, the potential collision zone may exist between the vehicle and the object if the area and/or the path polygon and the second trajectory associated with the object intersect. In some examples, the potential collision zone may exist between the vehicle and the object based on the second trajectory being within a threshold distance (e.g., 2 meters, 3 meters, 3 feet, 5 feet, etc.) of the area and/or the path polygon. In some examples, the threshold distance may be based on a pre-defined distance. In various examples, the threshold distance may be determined based on a known or perceived width of the object. In some examples, the threshold distance may be determined based on a known or perceived width of the object plus a buffer. The buffer may represent a safety buffer around the agent.

In various examples, the vehicle computing device may determine that the second trajectory (a trajectory sample) is within the threshold distance of the area and/or the path polygon and may expand the width of the second trajectory to determine whether a potential collision zone exists. The vehicle computing device may expand the width of the second trajectory based on the known or perceived width of the object and/or an object buffer. In some examples, the width expansion may be based on a pre-defined width (e.g., 6 feet, 2 meters, etc.) set by the vehicle computing device.

A described above, the potential collision zone may include four elements, a vehicle enter point, a vehicle exit point, an object enter point, and an object exit point. Each of the vehicle and object enter and exit points may include a position and distance.

The vehicle computing device may determine vehicle enter point and vehicle exit point positions based on an offset distance before and after second trajectory. In some examples, the offset distance may be a width of the agent, the width of the agent plus a buffer, or another distance calculated from the trajectory that will not result in an impact with the agent. In some examples, the offset distance may include a distance measured perpendicular to the second trajectory. In some examples, the offset distance may include a distance measured along the area and/or the path polygon (e.g., vehicle path) before and after the second trajectory. In various examples, the offset distance may be measured from the center of the area and/or the path polygon. In some examples, the offset distance may be measured from a forward most point of the vehicle along the area and/or the path polygon. In such examples, the offset distance may account for vehicle maneuvers (e.g., turns) and an affect thereof on a position of the vehicle. In some examples, the offset distance may include a pre-defined distance (e.g., a constant distance) from the second trajectory, such as, for example, based on a length of the vehicle. In some examples, the offset distance before and after the second trajectory may be the same or a different constant distance.

At operation 610, the process may include applying an overlap to the potential collision zone. In some examples, the overlap may include a time-space overlap, such as time-space overlap 300 or time-space overlap 400. The overlap may be based on a comparison of an object position cone and a vehicle position cone (as derived from the possible object and/or vehicle accelerations and/or velocities) or on one or more probability density functions. In various examples, the vehicle computing device may determine whether an overlap exists between the agent position cone and the vehicle position cone. In some examples, the vehicle computing device may determine whether a probability density function overlaps with the determined potential collision zone. Based on a determination that no overlap (of either the position cones or the probability density function) exists, the vehicle computing device may determine that no risk of collision (e.g., no likelihood of collision) exits.

Based on a determination that an overlap of the position cones and/or the probability density function(s) exist, the vehicle computing device may determine a risk of collision and/or likelihood of collision exists. In some examples, an amount of overlap of the position cones may determine a level of risk (e.g., high, medium, low) and/or a degree of likelihood. In some examples, an amount of area under a curve of a probability density function may determine the level of risk and/or degree of likelihood.

At operation 612, the process may include determining an action for the vehicle to perform. In some examples, the action to perform may be based on avoiding a collision between the vehicle and the agent. In various examples, the action to perform may be based on a determined level of risk and/or likelihood of collision. The action may include slowing the vehicle to yield to the agent, stopping the vehicle to yield to the agent, changing lanes left, or changing lanes right, going around an object, pulling out of a parking spot, pulling into a parking spot, or the like. In some examples, the action may include determining a safe stop position for the vehicle. In various examples, responsive to determining the action to perform, the vehicle computing device may again determine a second area associated with the vehicle and/or a second path polygon associated with a new path, plot object trajectories with respect to the second area and/or second path polygon, determine potential collision zones associated with the second area and/or second path polygon, and apply an overlap (e.g., a time-space overlap) to determine whether a collision risk and/or likelihood of collision may still exist after the action.

In various examples, the action may include a display of intent. The display of intent may represent a signal to objects and/or other vehicles in the environment of a follow-up action that the vehicle will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk of collision and/or likelihood of collision. In such examples, the follow-up action may be chosen based on a determination of the very low or zero risk and/or likelihood of collision.

FIG. 7 depicts an example process 700 for determining an action to perform to avoid a collision between a vehicle and an object in an environment, in accordance with embodiments of the disclosure. For example, some or all of the process 700 may be performed by one or more components in FIG. 5, as described herein. For example, some or all of the process 700 may be performed by the vehicle computing device(s) 504. At operation 702, the process may include determining an area associated with a vehicle traversing an environment, such as described with respect to path component 532 in FIG. 5. In various examples, the area may include an area associated with a path of the vehicle. In some examples, the area may include an area associated with a path polygon of the vehicle. In such examples, the process may include generating the path polygon associated with a path of a vehicle.

As described above, such a path polygon and/or area may comprise points which define a polygon surrounding a path of a vehicle as it traverses an environment.

At operation 704, the process may include determining a trajectory associated with an object (e.g., an agent) in the environment. The vehicle computing device may determine the object trajectory based on sensor data from one or more sensors of the vehicle and/or one or more remote sensors. In some examples, the process may include determining one or more trajectories representative of any number of possible paths in which an object may travel from a current position (e.g., at the time of perception) and/or based on a direction of travel. In various examples, the trajectories may include trajectory samples. The trajectory samples may represent a center of the object. The center of the object may include an estimated center of mass, an estimated center point of the agent, or the like.

At operation 706, the process may include determining a potential collision zone between the vehicle and the object. A determination of the potential collision zone may be based at least in part on the object trajectory and the vehicle area and/or path polygon. In some examples, the potential collision zone may exist between the vehicle and the object if the area and/or path polygon and a trajectory of the object intersect. In some examples, the potential collision zone may exist between the vehicle and the object based on a trajectory being within a threshold distance (e.g., 2 meters, 3 meters, 3 feet, 5 feet, etc.) of the area and/or path polygon. In some examples, the threshold distance may be based on a pre-defined distance. In various examples, the threshold distance may be determined based on a known or perceived width of the agent. In some examples, the threshold distance may be determined based on a known or perceived width of the object plus a buffer. The buffer may represent a safety buffer around the object.

In various examples, the vehicle computing device may determine that the trajectory (a trajectory sample) is within the threshold distance of the area and/or path polygon and may expand the width of the trajectory to determine whether a potential collision zone exists. The vehicle computing device may expand the width of the trajectory based on the known or perceived width of the object and/or a buffer. In some examples, the width expansion may be based on a pre-defined width (e.g., 6 feet, 2 meters, etc.) set by the vehicle computing device.

As described above, the potential collision zone may include four elements, a vehicle enter point, a vehicle exit point, an object enter point, and an object exit point, each of which may be associated with positions of entry and exit of the vehicle and the agent.

At operation 708, the process may include applying an overlap to the potential collision zone. In some examples, the overlap may include a time-space overlap. The overlap may be based on a comparison of an object position cone and a vehicle position cone (as derived from the possible object and/or vehicle accelerations and/or velocities) or on one or more probability density functions. In various examples, the vehicle computing device may determine whether an overlap exists between the object position cone and the vehicle position cone. In some examples, the vehicle computing device may determine whether a probability density function overlaps with the determined potential collision zone. Based on a determination that no overlap (of either the position cones or the probability density function) exists, the vehicle computing device may determine that no risk of collision (e.g., no likelihood of collision) exits.

Based on a determination that an overlap of the position cones and/or the probability density function(s) exist, the vehicle computing device may determine a risk (e.g. likelihood) of collision exists. In some examples, an amount of overlap of the position cones may determine a level of risk (e.g., high, medium, low) and/or a degree of likelihood. In some examples, an amount of area under a curve of probability density function(s) at a step in time may determine the level of risk at that step in time.

At operation 710, the process may include determining an action for the vehicle to perform. In some examples, the action to perform may be based on avoiding a collision between the vehicle and the agent. In various examples, the action to perform may be based on a determined level of risk and/or likelihood of collision. The action may include slowing the vehicle to yield to the object, stopping the vehicle to yield to the object, changing lanes left, or changing lanes right, going around an object, pulling out of a parking spot, pulling into a parking spot, or the like. In some examples, the action may include determining a safe stop position for the vehicle. In various examples, responsive to determining the action to perform, the vehicle computing device may again determine a second area associated with the vehicle and/or a second path polygon associated with a new path, plot object trajectories with respect to the second area and/or second path polygon, determine potential collision zones associated with the second area and/or second path polygon, and apply an overlap (e.g., a time-space overlap) to determine whether a collision risk and/or likelihood of collision may still exist after the action.

In various examples, the action may include a display of intent. The display of intent may represent a signal to objects and/or other vehicles in the environment of a follow-up action that the vehicle will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk and/or likelihood of collision. In such examples, the follow-up action may be chosen based on a determination of the very low or zero risk and/or likelihood of collision.

Figure 8:
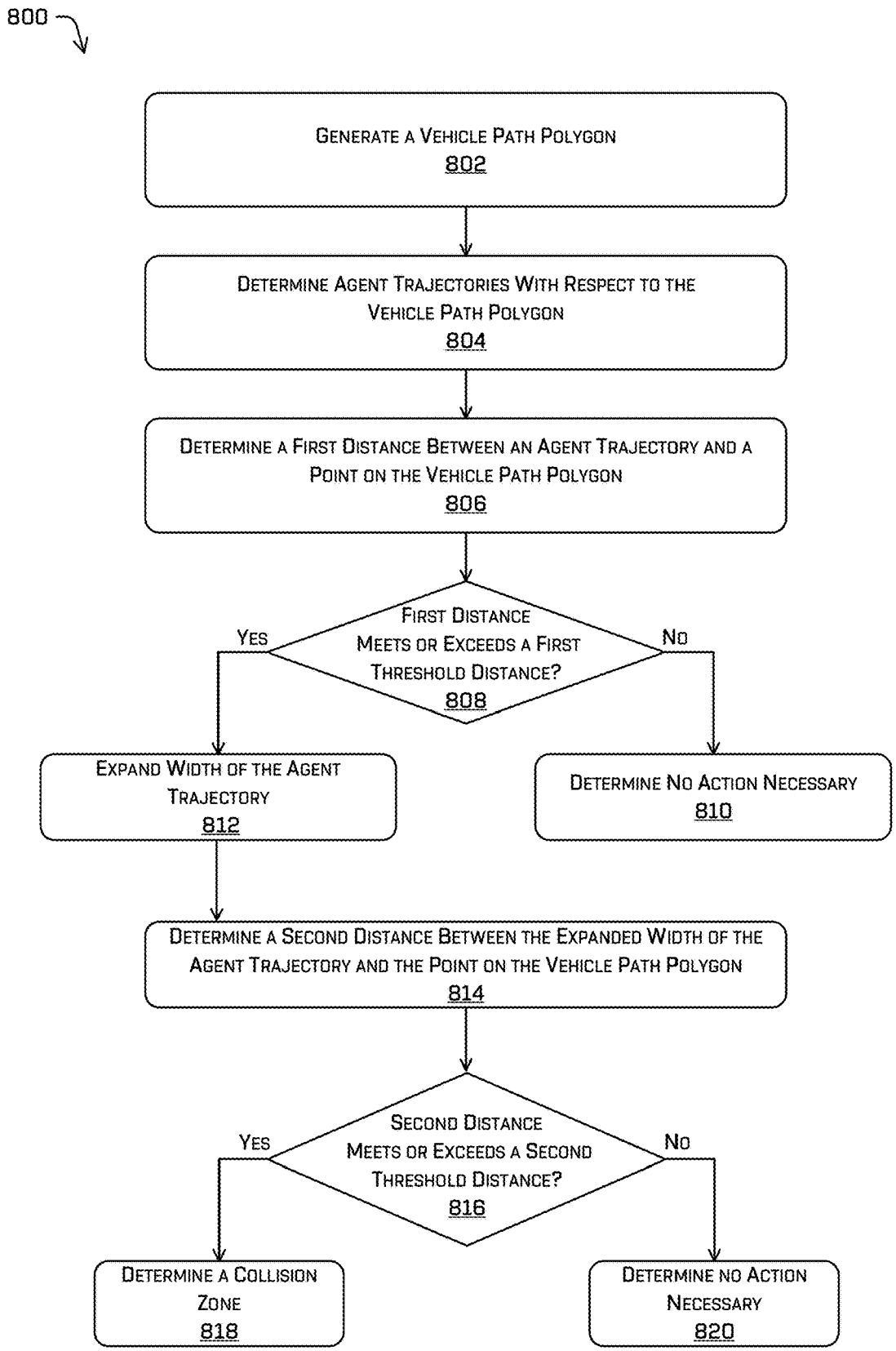
FIG. 8 depicts an example process for determining a collision zone between an autonomous vehicle and an agent in an environment, in accordance with embodiments of the disclosure.

FIG. 8 depicts an example process 800 for determining whether to perform an action to avoid a collision between an autonomous vehicle and an agent in an environment, in accordance with embodiments of the disclosure. For example, some or all of the process 800 may be performed by one or more components in FIG. 5, as described herein. For example, some or all of the process 800 may be performed by the vehicle computing device(s) 504.

At operation 802, the process may include generating a vehicle path polygon such as described with respect to path component 532 in FIG. 5.

As described above, such a path polygon and/or an area may comprise points which define a polygon surrounding a path of a vehicle as it traverses an environment.

At operation 804, the process may include determining agent trajectories with respect to the vehicle path polygon. The vehicle computing device may determine the agent trajectories based on sensor data from one or more sensors of the vehicle and/or one or more remote sensors. In some examples, the trajectories may include any number of possible paths in which an agent may travel from a current position (e.g., at the time of perception) and/or based on a direction of travel. In various examples, the trajectories may include trajectory samples. The trajectory samples may represent a center of the agent. The center of the agent may include an estimated center of mass, an estimated center point of the agent, or the like. In various examples, the process may include determining one or more agent polygons associated with the possible paths in which the agent may travel from the current position.

At operation 806, the process may include determining a first distance between an agent trajectory and a point on the vehicle path polygon. In some examples, the vehicle computing device may determine the first distance between a trajectory sample of the trajectory and a point of a point pair of the path polygon that is closest to the trajectory sample and/or trajectory. In some examples, such a determination may be made by determining a corresponding polygon associated with a trajectory (or trajectories) of the agent and determining an overlapping area of the agent polygon and the vehicle path polygon.

At operation 808, the process may include determining whether the first distance meets or exceeds a first threshold distance. The threshold distance may be based on an average width of a vehicle, a portion of an average width of a lane, a type of agent (e.g., motorcyclist, bicyclist, pedestrian, car, truck, etc.), and/or another factor.

If the distance does not meet or exceed the threshold distance (e.g., "no" in the operation 808), the process continues to operation 810. At operation 810, the process may include determine that no action is necessary. A determination that no action is necessary may be based on a determination that no collision zone and/or risk of collision exists between the path polygon and the agent trajectory.

If the distance meets or exceeds the threshold distance (e.g., "yes" in the operation 808), the process continues to operation 812. At operation 812, the process may include expanding a width of the agent trajectory. In at least some examples, this may be associated with determining a width of the agent polygon. The vehicle computing device may expand the width of the trajectory based on the known or perceived width of the agent and/or an agent buffer. In some examples, the width expansion may be based on a pre-defined width set by the vehicle computing device.

At operation 814, the process may include determining a second distance between the expanded width of the agent trajectory and the point on the vehicle path polygon that is closest to the trajectory sample and/or trajectory.

At operation 816, the process may include determining whether the second distance meets or exceeds a second threshold distance. In some examples, the second threshold distance may include a distance related to an overlap and/or intersection between the agent trajectory and the vehicle path polygon. In such examples, the second threshold distance may include a distance related to an amount of overlap or of the trajectory and the path polygon.

If the distance does not meet or exceed the threshold distance (e.g., "no" in the operation 816), the process continues to operation 818. At operation 818, the process may include determining that no action is necessary. A determination that no action is necessary may be based on a determination that no collision zone and/or risk of collision exists between the path polygon and the agent trajectory.

If the distance meets or exceeds the threshold distance (e.g., "yes" in the operation 816), the process continues to operation 820. At operation 820, the process may include determining a potential collision zone. Based at least in part on determining the potential collision zone, the vehicle computing device may further apply a time-space overlap to the potential collision zone, and if necessary, determine an action to take to avoid a collision between the vehicle and the agent. The action may include a yield (e.g., stop or slow forward movement), yield as to signal an intent, change lanes, and/or perform another action, as discussed above.

EXAMPLE CLAUSES

A: A system comprising: one or more processors; and one or more computer-readable media storing instructions executable by the one or more processors, wherein the instructions, when executed, cause the system to perform operations comprising: generating a path polygon associated with an autonomous vehicle, wherein the path polygon is representative of a planned path of the autonomous vehicle traveling through an environment; determining a trajectory associated with an agent in the environment; determining a potential collision zone between the path polygon and the trajectory, wherein the potential collision zone comprises an area of a possible collision between the autonomous vehicle and the agent; determining a likelihood of a collision between the autonomous vehicle and the agent based at least in part on a time-space overlap between the planned path of the autonomous vehicle and the trajectory associated with the agent; determining an action for the autonomous vehicle to take to avoid a collision with the agent based at least in part on the probability of collision; and controlling the autonomous vehicle based at least in part on the action.

B: The system as paragraph A describes, wherein the determining the potential collision zone further comprises: determining that the trajectory and the path polygon intersect.

C: The system as paragraphs A or B describe, wherein the trajectory comprises at least one trajectory sample representative of a center of the agent, and wherein the determining the potential collision zone further comprises: determining that a first distance between the at least one trajectory sample and a point associated with the path polygon is less than a first threshold distance; increasing a width associated with the trajectory to obtain an expanded trajectory; and determining that a second distance between the expanded trajectory and the point associated with the path polygon is less than a second threshold distance.

D: The system as any of paragraphs A-C describe, wherein the time-space overlap comprises at least one of: an overlap between an autonomous vehicle position cone and an agent position cone; or an overlap of one or more probability density functions and the collision zone.

E: The system as any of paragraphs A-D describe, wherein determining the action for the autonomous vehicle to take comprises: generating a second path polygon of the autonomous vehicle based on the action; determining a second potential collision zone between the autonomous vehicle and the agent based on the second path polygon; and determining a second likelihood of collision, wherein the controlling the autonomous vehicle is based at least in part on the second likelihood of collision.

F: A computer-readable medium having thereon computer-executable instructions that, responsive to execution, configure a computer to perform a system as any of paragraphs A-E describe.

G: A method comprising: determining a first trajectory associated with a vehicle in an environment; determining, based at least in part on the first trajectory, an area associated with the vehicle; determining a second trajectory associated with an object in the environment; determining a collision zone between the vehicle and the object based at least in part on the area and the second trajectory; applying an overlap to the collision zone, wherein the overlap comprises ranges of times during which the vehicle and the object are predicted to be in the collision zone; and determining an action for the vehicle to take based at least in part on the collision zone and the overlap.

H: The method as paragraph G describes, further comprising: controlling the vehicle based at least in part on the action.

I: The method as paragraphs G or H describe, further comprising: identifying a time gap based at least in part on a vehicle position cone and an agent position cone, wherein the determining the action for the vehicle to take is based at least in part on the time gap.

J: The method as any of paragraphs G-I describe, further comprising: determining that the area and the second trajectory intersect.

K: The method as any of paragraphs G-J describe, wherein a probability density function is associated with the object, the method further comprising: determining that at least part of the probability density function intersects with the collision zone; and computing, as a probability, an integral of the probability density function that intersects with the collision zone, wherein determining the action for the vehicle to take is based at least in part on the probability.

L: The method as any of paragraphs G-K describe, the method further comprising: determining that a first distance between the second trajectory and the area is less than a first threshold distance; increasing a width associated with the second trajectory to obtain an expanded width trajectory; and determining that a second distance between the expanded width trajectory and the area is less than a second threshold distance.

M: The method as any of paragraphs G-L describe, wherein determining the collision zone further comprises: determining an object enter point; determining an object exit point; determining a vehicle enter point; and determining a vehicle exit point.

N: The method as paragraph M describes, further comprising: determining an object enter time associated with the object enter point, an object exit time associated with the object exit point, a vehicle enter time associated with the vehicle enter point, and a vehicle exit time associated with the vehicle exit point; and determining that at least one of: a first time between the vehicle exit time and the agent enter time is less than a first threshold time; or a second time between the agent exit time and the vehicle enter time is less than a second threshold time, wherein the action is taken based additionally in part on this determination.

O: The method as any of paragraphs G-N describe, further comprising: identifying a point of a set of points defining the area; determining a remaining set of points of the set of points defining the area, wherein the remaining set of points comprises the set of points without the point; determining that a first area associated with the set of points is substantially similar to the second area associated with the remaining set of points; and removing the point from the set of points defining the area.

P: A system or device comprising: a processor; and a computer-readable medium coupled to the processor, the computer-readable medium including instructions to configure the processor to perform a computer-implemented method as any of paragraphs G-O describe.

Q: A system or device comprising: a means for processing; and a means for storing coupled to the means for processing, the means for storing including instructions to configure one or more devices to perform a computer-implemented method as any of paragraphs G-O describe.

R: A computer-readable medium having thereon computer-executable instructions that, responsive to execution, configure a computer to perform a method as any one of paragraphs G-O describe.

S: A non-transitory computer-readable medium storing instructions that, when executed, cause one or more processors to perform operations comprising: determining an area associated with a vehicle traversing an environment; determining a trajectory associated with an object in the environment; determining a collision zone between the vehicle and the object based at least in part on the area and the trajectory; applying an overlap to the collision zone, wherein the overlap comprises ranges of times during which the vehicle and the object are predicted to be in the collision zone; and determining an action for the vehicle to take based at least in part on the collision zone and the overlap.

T: The non-transitory computer-readable medium as paragraph S describes, wherein the overlap comprises at least one of: a first overlap between a vehicle position cone and an object position cone; or a second overlap of one or more probability density function and the collision zone.

U: The non-transitory computer-readable medium as paragraphs S or T describe, the operations further comprising: determining, as a probability, an integral of the one or more probability functions based at least in part on the second overlap of the probability density function and the collision zone, wherein the action is based at least in part on the probability.

V: The non-transitory computer-readable medium as any of paragraphs S-U describe, the operations further comprising: applying a compression technique to the path polygon, wherein the compression technique is configured to: calculate a first area associated with a plurality of points associated with the area; identify a point of the plurality of points to remove; determine a remainder of the plurality of points; calculate a second area associated with a polygon associated with the remainder; determine a difference between the first area and the second area; and determine the difference is within a threshold difference.

W: The non-transitory computer-readable medium as any of paragraphs S-V describe, wherein determining the collision zone further comprises at least one of: determining that the trajectory and the area intersect; or determining that a first distance between the trajectory and the area is less than a first threshold distance; increasing a width associated with the trajectory to obtain an expanded width trajectory; and determining that a second distance between the expanded trajectory and the area is less than a second threshold distance.

X: The non-transitory computer-readable medium as any of paragraphs S-W describe, wherein the determining the collision zone further comprises: determining an object enter point based at least in part on a maximum object velocity; determining an object exit point based at least in part on a minimum object velocity; determining a vehicle enter point based at least in part on a vehicle maximum velocity; and determining a vehicle exit point based at least in part on a vehicle minimum velocity.

Y: A system or device comprising: a processor; and a computer-readable medium coupled to the processor, the computer-readable medium including instructions to configure the processor to perform a computer-implemented method as any of paragraphs S-X describe.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
generating a path polygon associated with an autonomous vehicle, wherein the path polygon is representative of a planned path of the autonomous vehicle traveling through an environment;
determining a trajectory associated with an agent in the environment;
determining a potential collision zone between the path polygon and the trajectory, wherein the potential collision zone comprises an area of a possible collision between the autonomous vehicle and the agent;
determining a likelihood of a collision between the autonomous vehicle and the agent based at least in part on a time-space overlap between the planned path of the autonomous vehicle and the trajectory associated with the agent, wherein the time-space overlap represents at least one time corresponding to when the autonomous vehicle and the agent are predicted to be located in the potential collision zone;
determining an action for the autonomous vehicle to take to avoid a collision with the agent based at least in part on the likelihood of collision; and
controlling the autonomous vehicle based at least in part on the action.

2. The system of claim 1, wherein the determining the potential collision zone further comprises:
determining that the trajectory and the path polygon intersect.

3. The system of claim 1, wherein the trajectory comprises at least one trajectory sample representative of a center of the agent, and wherein the determining the potential collision zone further comprises:
determining that a first distance between the at least one trajectory sample and a point associated with the path polygon is less than a first threshold distance;
increasing a width associated with the trajectory to obtain an expanded trajectory; and
determining that a second distance between the expanded trajectory and the point associated with the path polygon is less than a second threshold distance.

4. The system of claim 1, wherein the time-space overlap comprises at least one of:
an overlap between an autonomous vehicle position cone and an agent position cone; or
an overlap of one or more probability density functions and the collision zone.

5. The system of claim 1, wherein determining the action for the autonomous vehicle to take comprises:
generating a second path polygon of the autonomous vehicle based on the action;
determining a second potential collision zone between the autonomous vehicle and the agent based on the second path polygon; and
determining a second likelihood of collision,
wherein the controlling the autonomous vehicle is based at least in part on the second likelihood of collision.

6. A method comprising:
determining a first trajectory associated with a vehicle in an environment;
determining, based at least in part on the first trajectory, an area associated with the vehicle;
determining a second trajectory associated with an object in the environment;
determining a collision zone between the vehicle and the object based at least in part on the area and the second trajectory;
applying an overlap to the collision zone, wherein the overlap comprises ranges of times during which the vehicle and the object are predicted to be located in the collision zone; and
determining an action for the vehicle to take based at least in part on the collision zone and the overlap; and
controlling the vehicle based at least in part on the action.

7. The method of claim 6, further comprising:
identifying a time gap based at least in part on a vehicle position cone and an agent position cone,
wherein the determining the action for the vehicle to take is based at least in part on the time gap.

8. The method of claim 6, further comprising:
determining that the area and the second trajectory intersect.

9. The method of claim 6, wherein a probability density function is associated with the object, the method further comprising:
determining that at least part of the probability density function intersects with the collision zone; and
computing, as a probability, an integral of the probability density function that intersects with the collision zone,
wherein determining the action for the vehicle to take is based at least in part on the probability.

10. The method of claim 6, the method further comprising:
determining that a first distance between the second trajectory and the area is less than a first threshold distance;
increasing a width associated with the second trajectory to obtain an expanded width trajectory; and
determining that a second distance between the expanded width trajectory and the area is less than a second threshold distance.

11. The method of claim 6, wherein determining the collision zone further comprises:
determining an object enter point;
determining an object exit point;
determining a vehicle enter point; and
determining a vehicle exit point.

12. The method of claim 11, further comprising:
determining an object enter time associated with the object enter point, an object exit time associated with the object exit point, a vehicle enter time associated with the vehicle enter point, and a vehicle exit time associated with the vehicle exit point; and
determining that at least one of:
a first time between the vehicle exit time and the agent enter time is less than a first threshold time; or
a second time between the agent exit time and the vehicle enter time is less than a second threshold time,
wherein the action is determined based additionally in part on at least one of the first time being less than the first threshold time or the second time being less than the second threshold time.

13. The method of claim 6, further comprising:
identifying a point of a set of points defining the area;
determining a remaining set of points of the set of points defining the area, wherein the remaining set of points comprises the set of points without the point;
determining that a first area associated with the set of points is substantially similar to the second area associated with the remaining set of points; and
removing the point from the set of points defining the area.

14. The method of claim 6, wherein determining the action for the vehicle to take comprises:
generating a second path polygon of the vehicle based on the action;
determining a second potential collision zone between the vehicle and the object based on the second path polygon; and
determining a second likelihood of collision.

15. A non-transitory computer-readable medium storing instructions that, when executed, cause one or more processors to perform operations comprising:
determining an area associated with a vehicle traversing an environment;
determining a trajectory associated with an object in the environment;
determining a collision zone between the vehicle and the object based at least in part on the area and the trajectory;
applying an overlap to the collision zone, wherein the overlap comprises ranges of times during which the vehicle and the object are predicted to be located in the collision zone;
determining an action for the vehicle to take based at least in part on the collision zone and the overlap; and
controlling the vehicle based at least in part on the action.

16. The non-transitory computer-readable medium of claim 15, wherein the overlap comprises at least one of:
a first overlap between a vehicle position cone and an object position cone; or
a second overlap of one or more probability density functions and the collision zone.

17. The non-transitory computer-readable medium of claim 16, the operations further comprising:
determining, as a probability, an integral of the one or more probability density functions based at least in part on the second overlap of the one or more probability density functions and the collision zone,
wherein the action is based at least in part on the probability.

18. The non-transitory computer-readable medium of claim 15, the operations further comprising:
applying a compression technique to the path polygon, wherein the compression technique is configured to:
calculate a first area associated with a plurality of points associated with the area;
identify a point of the plurality of points to remove;
determine a remainder of the plurality of points;
calculate a second area associated with a polygon associated with the remainder;
determine a difference between the first area and the second area; and
determine the difference is within a threshold difference.

19. The non-transitory computer-readable medium of claim 15, wherein determining the collision zone further comprises at least one of:
determining that the trajectory and the area intersect; or
determining that a first distance between the trajectory and the area is less than a first threshold distance;
increasing a width associated with the trajectory to obtain an expanded width trajectory; and
determining that a second distance between the expanded trajectory and the area is less than a second threshold distance.

20. The non-transitory computer-readable medium of claim 15, wherein the determining the collision zone further comprises:
determining an object enter point based at least in part on a maximum object velocity;
determining an object exit point based at least in part on a minimum object velocity;
determining a vehicle enter point based at least in part on a vehicle maximum velocity; and
determining a vehicle exit point based at least in part on a vehicle minimum velocity.

* * * * *